US012595368B2

(12) United States Patent
Chang et al.

(10) Patent No.: US 12,595,368 B2
(45) Date of Patent: Apr. 7, 2026

(54) UV/HEVL-FILTERING CONTACT LENSES

(71) Applicant: Alcon Inc., Fribourg (CH)

(72) Inventors: Frank Chang, Cumming, GA (US); Troy Vernon Holland, Suwanee, GA (US); Adam K. Sniady, Lilburn, GA (US); Houliang Tang, Cumming, GA (US)

(73) Assignee: Alcon Inc., Fribourg (CH)

( * ) Notice: Subject to any disclaimer, the term of this patent is extended or adjusted under 35 U.S.C. 154(b) by 496 days.

(21) Appl. No.: 18/321,435

(22) Filed: May 22, 2023

(65) Prior Publication Data

US 2023/0374306 A1 Nov. 23, 2023

Related U.S. Application Data

(60) Provisional application No. 63/365,156, filed on May 23, 2022.

(51) Int. Cl.
*C08L 83/04* (2006.01)
*C08J 3/075* (2006.01)

(52) U.S. Cl.
CPC ............... *C08L 83/04* (2013.01); *C08J 3/075* (2013.01); *C08J 2383/04* (2013.01); *C08J 2471/02* (2013.01)

(58) Field of Classification Search
CPC combination set(s) only.
See application file for complete search history.

(56) References Cited

U.S. PATENT DOCUMENTS 3,299,173 A 1/1967 Roselli
3,408,429 A 10/1968 Wichterle
4,136,250 A 1/1979 Mueller et al.
4,153,641 A 5/1979 Deichert et al.
(Continued)

FOREIGN PATENT DOCUMENTS

CN 109598100 A 4/2019
EP 0632329 A1 1/1995
JP 2021185429 A 12/2021
WO 2015037627 A1 3/2015
WO 2018224976 A1 12/2018

OTHER PUBLICATIONS

A. A. Gridnev, et al., Introduction of free radicals into the macrocyclic ring of porphyrins during polymerization of vinylpyrrolidone, Institute of Physical-Technical Problems, (pp. 670-675) Moscow. Translated from Teoreticheskaya i Eksperimantal'naya Khimiya, vol. 25, No. 6, pp. 727-732, Nov.-Dec. 1989.
(Continued)

*Primary Examiner* — Peter A Salamon
(74) *Attorney, Agent, or Firm* — Jian Zhou

(57) ABSTRACT

Described herein is UV/HEVL-absorbing contact lens of the invention comprises a bulk hydrogel material that comprises repeating units of at least one UV-absorbing vinylic monomer, repeating units of at least one UV/HEVL-absorbing vinylic monomer, and derivatives of a reactive Cu(II)-porphyrin present in selected amounts and at a selected ratio. A UV/HEVL-filtering contact lens of the invention not only can provide Class I UV protection against UVA and UVB rays (i.e., filtering more than 90% of UVA and 99% of UVB rays) but also can mimics the natural crystalline lens of a human eye in providing HEVL protection.

20 Claims, 2 Drawing Sheets

(56) References Cited

Figure 1:
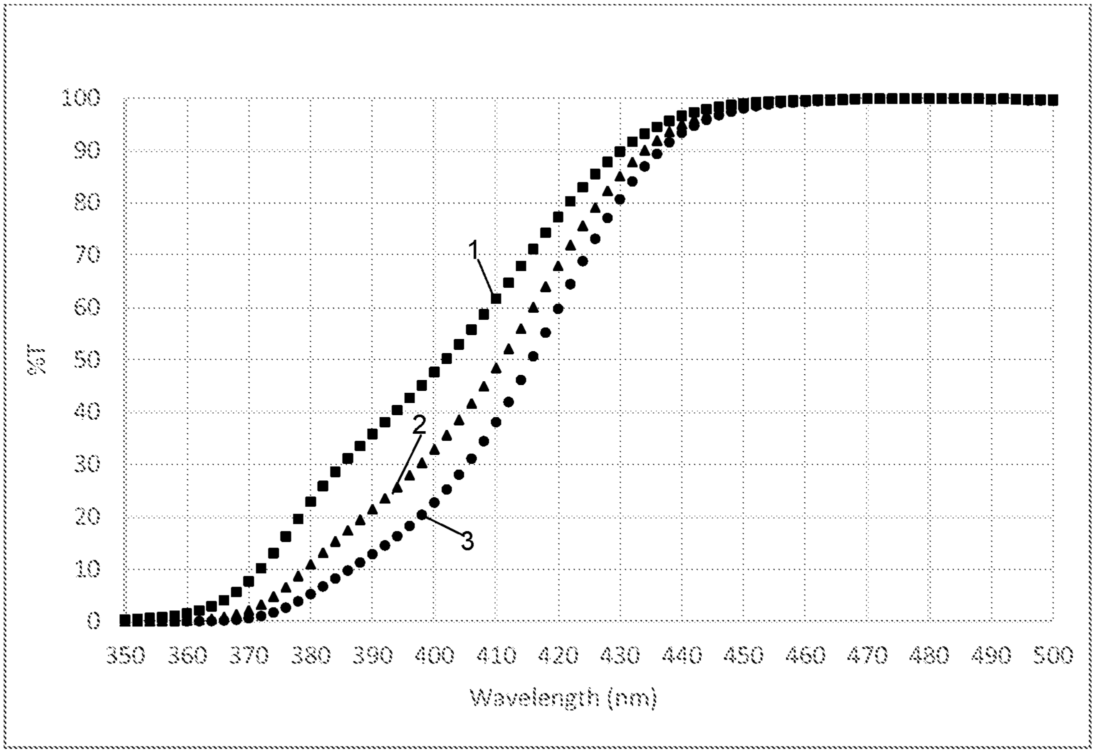

U.S. PATENT DOCUMENTS 4,182,822 A 1/1980 Chang
4,189,546 A 2/1980 Deichert et al.
4,254,248 A 3/1981 Friends et al.
4,259,467 A 3/1981 Keogh et al.
4,260,725 A 4/1981 Keogh et al.
4,261,875 A 4/1981 LeBoeuf
4,276,402 A 6/1981 Chromecek
4,327,203 A 4/1982 Deichert et al.
4,341,889 A 7/1982 Deichert et al.
4,343,927 A 8/1982 Chang
4,347,198 A 8/1982 Ohkada et al.
4,355,147 A 10/1982 Deichert et al.
4,444,711 A 4/1984 Schad
4,460,534 A 7/1984 Boehm et al.
4,486,577 A 12/1984 Mueller et al.
4,528,311 A 7/1985 Beard
4,543,398 A 9/1985 Bany et al.
4,605,712 A 8/1986 Mueller et al.
4,612,358 A 9/1986 Besecke
4,661,575 A 4/1987 Tom
4,684,538 A 8/1987 Klemarczyk
4,703,097 A 10/1987 Wingler et al.
4,716,234 A 12/1987 Dunks
4,833,218 A 5/1989 Lee
4,837,289 A 6/1989 Mueller et al.
4,878,748 A 11/1989 Johansen
4,954,586 A 9/1990 Toyoshim et al.
4,954,587 A 9/1990 Mueller
5,010,141 A 4/1991 Mueller
5,034,461 A 7/1991 Lai et al.
5,039,761 A 8/1991 Ono et al.
5,070,170 A 12/1991 Robertson et al.
5,070,215 A 12/1991 Bambury et al.
5,079,319 A 1/1992 Mueller
5,346,946 A 9/1994 Yokoyama et al.
5,358,995 A 10/1994 Lai et al.
5,387,632 A 2/1995 Lai et al.
5,400,175 A 3/1995 Johansen
5,416,132 A 5/1995 Yokoyama et al.
5,449,729 A 9/1995 Lai
5,451,617 A 9/1995 Lai et al.
5,486,579 A 1/1996 Lai et al.
5,508,317 A 4/1996 Müller
5,527,925 A * 6/1996 Chabrecek .......... C08B 37/0072
522/42
5,583,163 A 12/1996 Müller
5,583,463 A 12/1996 Merritt
5,662,707 A 9/1997 Jinkerson
5,665,840 A 9/1997 Pöhlmann et al.
5,712,356 A 1/1998 Bothe et al.
5,760,100 A 6/1998 Nicolson et al.
5,789,464 A 8/1998 Müller
5,843,446 A 12/1998 Ladd et al.
5,849,810 A 12/1998 Müller
5,849,841 A 12/1998 Mühlebach et al.
5,894,002 A 4/1999 Boneberger et al.
5,962,548 A 10/1999 Vanderlaan et al.
5,981,675 A 11/1999 Valint, Jr. et al.
6,039,913 A 3/2000 Hirt et al.
6,107,480 A 8/2000 Funken et al.
6,158,862 A 12/2000 Patel
6,165,408 A 12/2000 Steinmann
6,166,236 A 12/2000 Bambury et al.
6,221,303 B1 4/2001 Steinmann
6,303,687 B1 10/2001 Müller
6,367,929 B1 4/2002 Maiden et al.
6,472,489 B1 10/2002 Stockinger
6,479,587 B1 11/2002 Stockinger et al.
6,492,478 B1 12/2002 Steinmann
6,719,929 B2 4/2004 Winterton et al.
6,762,264 B2 7/2004 Kunzler et al.
6,822,016 B2 11/2004 McCabe et al.
6,867,245 B2 3/2005 Iwata et al.
6,955,430 B2 10/2005 Pratt
6,995,192 B2 2/2006 Phelan et al.
7,214,809 B2 5/2007 Zanini et al.
7,384,590 B2 6/2008 Kelly et al.
7,387,759 B2 6/2008 Kelly et al.
7,423,074 B2 9/2008 Lai et al.
7,556,376 B2 7/2009 Ishak
7,605,190 B2 10/2009 Moszner et al.
7,803,359 B1 9/2010 Jinkerson
7,858,000 B2 12/2010 Winterton
7,977,430 B2 7/2011 Devlin et al.
8,147,897 B2 4/2012 Ferreiro et al.
8,153,703 B2 4/2012 Laredo
8,163,206 B2 4/2012 Chang
8,232,326 B2 7/2012 Laredo
8,360,574 B2 1/2013 Ishak
8,409,599 B2 4/2013 Wu et al.
8,415,405 B2 4/2013 Maggio et al.
8,475,529 B2 7/2013 Clarke
8,480,227 B2 7/2013 Qiu et al.
8,529,057 B2 9/2013 Qiu et al.
8,557,334 B2 10/2013 Samuel et al.
8,585,938 B1 11/2013 Jinkerson
8,614,261 B2 12/2013 Iwata et al.
8,658,748 B2 2/2014 Liu
8,835,525 B2 9/2014 Kuyu et al.
8,882,267 B2 11/2014 Ishak
8,993,651 B2 3/2015 Chang et al.
9,097,840 B2 8/2015 Chang
9,103,965 B2 8/2015 Chang
9,187,601 B2 11/2015 Huang
9,217,813 B2 12/2015 Liu et al.
9,315,669 B2 4/2016 Holland
9,377,569 B2 6/2016 Ishak et al.
9,475,827 B2 10/2016 Chang
9,505,184 B2 11/2016 Kolluru
9,683,102 B2 6/2017 Cefalo et al.
9,814,658 B2 11/2017 Ishak et al.
10,081,697 B2 9/2018 Huang
10,254,567 B2 4/2019 Chang
10,301,451 B2 5/2019 Jing
10,465,047 B2 11/2019 Jing
10,551,637 B2 2/2020 Ishak et al.
10,610,472 B2 4/2020 Ishak et al.
2005/0237483 A1* 10/2005 Phelan ............. B29D 11/00038
351/159.66
2008/0143003 A1* 6/2008 Phelan ............. B29D 11/00317
351/159.28
2009/0143499 A1* 6/2009 Chang .................... C08G 77/46
528/25
2015/0094393 A1 4/2015 Holland
2016/0216407 A1 7/2016 Kojima et al.
2017/0183520 A1* 6/2017 Breitkopf ............. C09D 11/033
2017/0235034 A1 8/2017 Cefalo et al.
2017/0242274 A1 8/2017 Holland
2017/0242275 A1* 8/2017 Chang .............. B29D 11/00134
2018/0371139 A1 12/2018 Mahadevan et al.
2019/0002415 A1 1/2019 Mahadevan et al.
2019/0002459 A1 1/2019 Mahadevan et al.
2019/0271798 A1 9/2019 Mahadevan et al.
2019/0339544 A1 11/2019 Dibella, Jr. et al.
2020/0002267 A1 1/2020 Maharvi et al.
2020/0095187 A1 3/2020 Arnold et al.
2020/0407324 A1 12/2020 Mahadevan et al.
2020/0407337 A1 12/2020 Mahadevan
2021/0026054 A1 1/2021 Cefalo
2022/0281193 A1* 9/2022 Tang ................ B29D 11/00134
2023/0138968 A1 5/2023 Acerson

OTHER PUBLICATIONS

Algvere, et al., Age-related maculopathy and the impact of blue light hazard, Acta Ophthalmologica Scandinavica, vol. 84; pp. 4-15, 2006.

Jilin Zhou, MD, et al., Light Filtering in an RPE Culture Model, Optom Vis Sci., vol. 88 No. 6: pp. 1-12, Jun. 2011.

Kernt, et al., Cytoprotective effects of a blue light-filtering intraocular lens on human retinal pigment epithelium by reducing phototoxic effects on vascular endothelial growth factor-a, Bax, and Bcl-2

(56) References Cited

OTHER PUBLICATIONS expression; J. Cataract Refractive Surgery, vol. 35; pp. 354-362, 2009.
Mainster et al., How Much Blue Light should an IOL Transmit?, British J. of Ophthalmology, vol. 87, pp. 1523-1529, 2003.
Mainster, Violet and blue light blocking intraocular lenses: photoprotection versus photoreception, Br. J. Ophthalmol, vol. 90; pp. 784-792, 2006.
Makoto Obata et al., RAFT Synthesis of an Amphiphilic Block Copolymer Bearing Chlorin Rings in the Hydrophobic Segment and Its Application in Photodynamic Therapy, Journal of Polymer Science, Part A: Polymer Chemistry, vol. 55, pp. 3395-3403, 2017.
Makoto Obata, et al., Porphyrin Derivatives Act as Vinylene Monomers in TEMPO-Mediated Radical Copolymerization with Styrene, Journal of Polymer Science Part A: Polymer Chemistry, vol. 50, pp. 3592-3597, 2012.
Raymond Bonnett, et al., Photobleaching of sensitisers used in photodynamic therapy, Tetrahedron, pp. 9513-9547, 2001.
Rezai, et al., AcrySof natural filter decreases blue light-induced apoptosis in human retinal pigment epithelium, Graefe's Arch Clin Exp Ophthalmol, vol. 246, pp. 671-676, 2008.
SM Downes, Ultraviolet or blue-filtering intraocular lenses: what is theevidence?, Eye (2016) 30, 215-221, online at www.nature.com/eye.
Tanito, et al., Protective effects of soft acrylic yellow filter against blue light-induced retinal damage in rats, Experimental Eye Research; vol. 83, pp. 1493-1504, 2006.

* cited by examiner

UV/HEVL-FILTERING CONTACT LENSES

This application claims the benefit under 35 USC § 119 (e) of U.S. provisional application No. 63/365,156 filed on 23 May 2022, incorporated by references in its entirety.

This invention is related to contact lenses, preferably silicone hydrogel contact lens, capable of filtering UV lights and high-energy visible lights (HEVL) with wavelengths from 380 nm to 450 nm.

BACKGROUND

LED lights and electronic device, including smart phones, computer screens, LCD and LED televisions, have been extensively used. They typically can emit short wavelength visible light, including violet light (380-450 nm) and blue light (450-495 nm). Such short wavelength visible lights were shown to be damaging to cells both in in vitro and in vivo studies reported in Experimental Eye Research 2006, 83, 1493; J. Cataract Refrac Surg 2009, 35, 354; Graefe's Arch Clin Exp Ophthalmol 2008, 246, 671; Acta Ophthalmologica Scandinavica 2006, 84, 4; Br J Ophthalmol 2006, 90, 784; Optometry and Vision Science 2011, 88(6), 1. A great effort has been made to develop HELV-filtering ophthalmic lenses, such as, spectacles, contact lenses, intraocular lenses, etc. to protect eyes from increasing exposures of HEVL due to widely use of LED lights and LED displays, e.g., smart phone, TV and computer monitor (see, e.g., U.S. Pat. Nos. 4,612,358, 4,528,311, 4,716,234, 4,878,748, 5,400,175, 5,662,707, 6,158,862, 6,955,430, 7,556,376, 7,803,359, 8,153,703, 8,232,326, 8,360,574, 8,585,938, 8,882,267, 9,377,569, 9,683,102, 9,814,658, 10,551,637, and 10,610,472; U.S. Pat. Appl. Pub. Nos. 20170242274, 20180371139, 20190002415, 20190002459, 20190271798, 20190339544, 20200002267,20200095187, 20200407324, and 20200407337).

TOTAL30® contact lenses (from Alcon) not only include Class I UV absorption for protection against UVA and UVB rays (i.e., filtering more than 90% of UVA and 99% of UVB rays), but also can filter out approximately 34% of HEVL rays entering the eye (between 380-450 nm). TOTAL30® is the first contact lens to offer HEVL-filtering capability that is constantly in effect while wearing the lenses regardless of the lighting conditions.

It would still be desirable to have a contact lens product with HELV-filtering capability much higher than TOTAL30® contact lenses to better protect wears' eyes from HEVL damages, especially violet light damages.

SUMMARY OF THE INVENTION

The invention provides a UV/HEVL-filtering contact lens, comprising a bulk hydrogel material that comprises (1) repeating units of at least one hydrophilic vinylic monomer, (2) repeating units of at least one vinylic crosslinker, (3) repeating units of at least one UV-absorbing vinylic monomer that absorbs UV lights between 280 nm and 380 nm; (4) at least one UV/HEVL-absorbing vinylic monomer that absorbs UV lights between 280 nm and 380 nm and HEVL between 380 nm and 450 nm; and (5) derivatives of at least one Cu(II)-porphyrin, wherein the derivatives are covalently attached to the bulk hydrogel material and have an absorption peak in a region from 395 nm to 435 nm (i.e., a Soret peak or band) in visible absorption spectrum, wherein said components (3), (4) and (5) are present in the bulk hydrogel material in amounts and at a ratio for rendering the UV/HEVL-filtering contact lens to have a UVA % T of less than less 10%, UVB % T of less than 1%, a HEVL % T of about 60% or less, a % T at 420 nm of about 40% or less, and a % T of about 80% or greater at a wavelength between 450 nm and 500 nm.

BRIEF DESCRIPTIONS OF THE DRAWINGS

FIG. 1 shows the UV/visible transmission spectra of contact lenses prepared from a polymerizable composition comprising 0.9 wt % of Norbloc (a UV-absorbing vinylic monomer), a varied amount of UV28 (a UV/HEVL-absorbing vinylic monomer) Curve 1 (square)—0.2 wt % UV28; Curve 2 (triangle)—0.3 wt % UV28; Curve 3 (circle)—0.4 wt % UV28.

Figure 2:
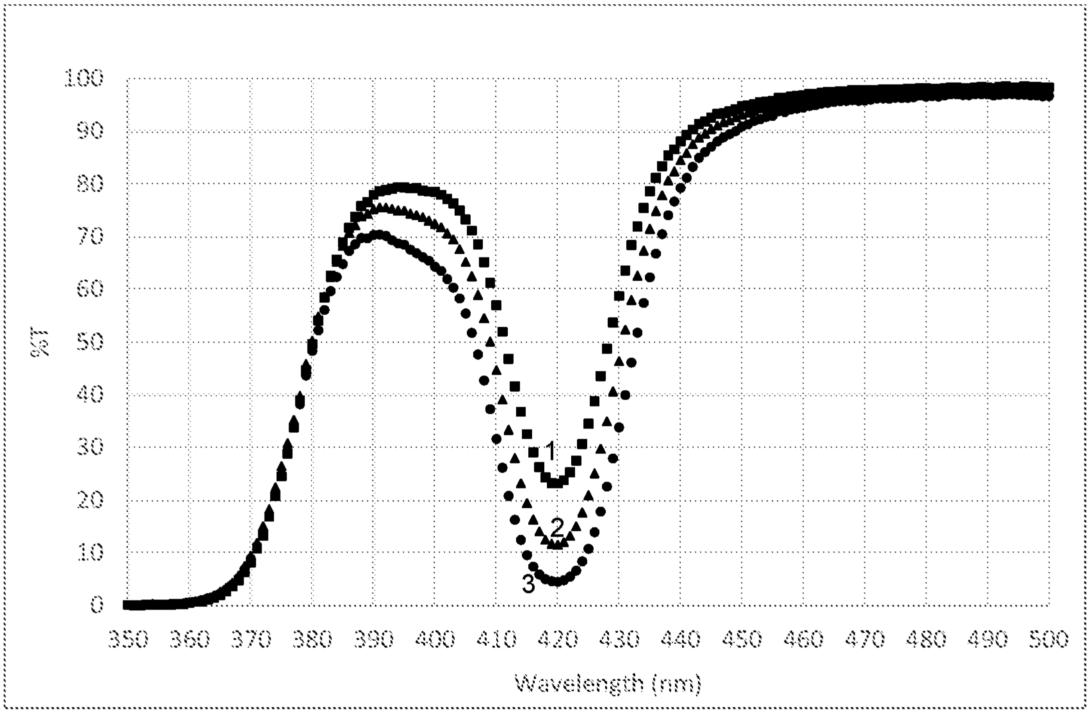

FIG. 2 shows the UV/visible transmission spectra of contact lenses prepared from a polymerizable composition comprising 0.9 wt % of Norbloc, a varied amount of Cu(II)-TBP-MAm, and a varied amount of RB247 (a polymerizable blue dye): Curve 1 (square)—0.03 wt % Cu(II)-TBP-Mam; Curve 2 (triangle)—0.05 wt % Cu(II)-TBP-Mam; Curve 3 (circle)—0.07 wt % Cu(II)-TBP-Mam.

Figure 3:
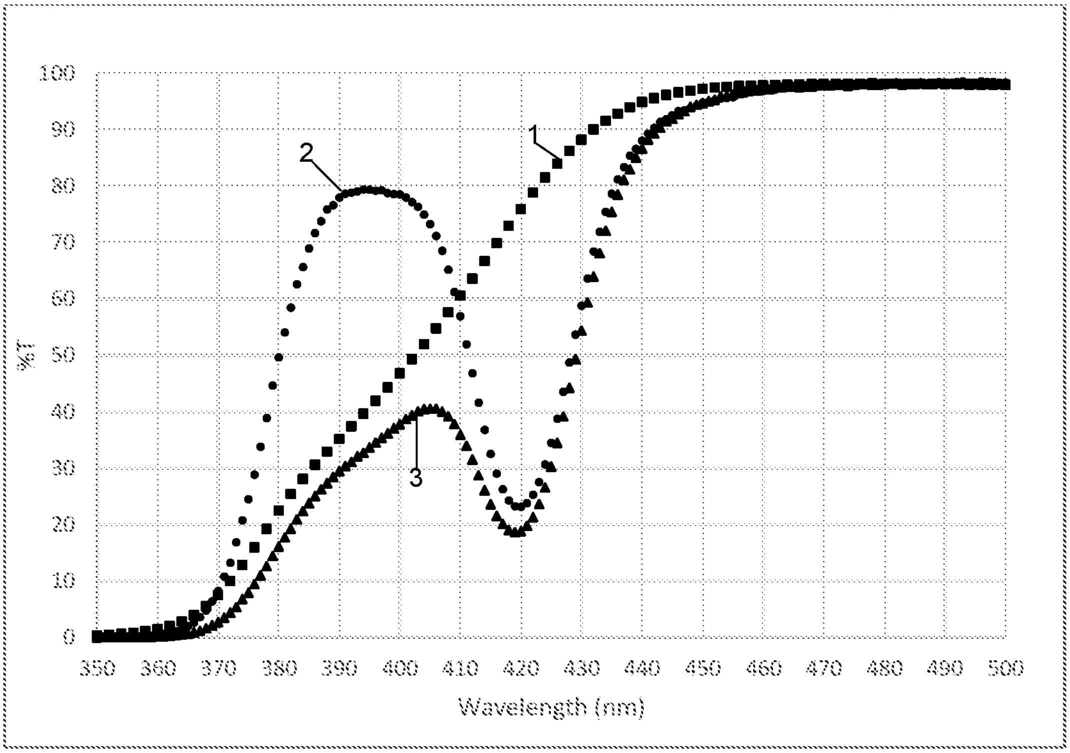

FIG. 3 shows the UV/visible transmission spectrum of contact lenses prepared from a polymerizable composition comprising (i) 0.9 wt % of Norbloc and (ii) 0.2 wt % UV28, 0.03 wt % Cu(II)TBP-Mam, or combination thereof: Curve 1 (square)—0.2 wt % UV28; Curve 2 (circle)—0.03 wt % Cu(II)-TBP-Mam; Curve 3 (triangle)—0.03 wt % Cu(II)-TBP-Mam+0.2 wt % UV28.

Figure 4:
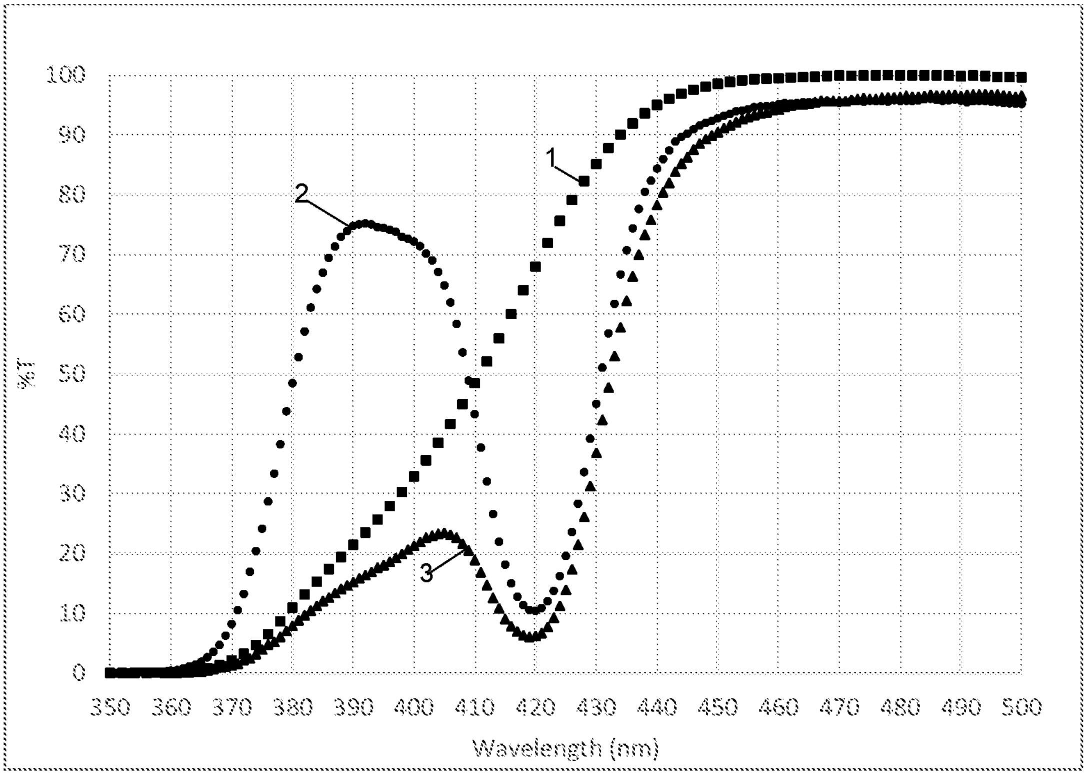

FIG. 4 shows the UV/visible transmission spectrum of contact lenses prepared from a polymerizable composition comprising (i) 0.9 wt % of Norbloc and (ii) 0.3 wt % UV28, 0.05 wt % Cu(II)TBP-Mam, or combination thereof: Curve 1 (square)—0.3 wt % UV28; Curve 2 (circle)—0.05 wt % Cu(II)-TBP-Mam; Curve 3 (triangle)—0.05 wt % Cu(II)-TBP-Mam+0.3 wt % UV28.

DETAILED DESCRIPTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"About" as used herein means that a number referred to as "about" comprises the recited number plus or minus 1-10% of that recited number.

"Optional" or "optionally" means that the subsequently described event or circumstance can or cannot occur, and that the description includes instances where the event or circumstance occurs and instances where it does not.

An "ophthalmic device", as used herein, refers to a contact lens (hard or soft), an intraocular lens, a corneal onlay, other ophthalmic devices (e.g., stents, glaucoma shunt, or the like) used on or about the eye or ocular vicinity.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens.

A "hydrogel contact lens" refers to a contact lens comprising a hydrogel bulk (core) material. A hydrogel bulk material can be a non-silicone hydrogel material or preferably a silicone hydrogel material.

A "hydrogel" or "hydrogel material" refers to a crosslinked polymeric material which has three-dimensional polymer networks (i.e., polymer matrix), is insoluble in water, but can hold at least 10% by weight of water in its polymer matrix when it is fully hydrated (or equilibrated).

A siloxane, which often also described as a silicone, refers to a molecule having at least one moiety of —Si—O—Si— where each Si atom carries two organic groups as substituents.

A "silicone hydrogel" or "SiHy" refers to a silicone-containing hydrogel obtained by copolymerization of a polymerizable composition comprising at least one silicone-containing monomer or at least one silicone-containing macromer or at least one crosslinkable silicone-containing prepolymer.

As used in this application, the term "non-silicone hydrogel" refers to a hydrogel that is theoretically free of silicon.

"Hydrophilic," as used herein, describes a material or portion thereof that will more readily associate with water than with lipids.

The term "room temperature" refers to a temperature of about 22° C. to about 26° C.

The term "soluble", in reference to a compound or material in a solvent, means that the compound or material can be dissolved in the solvent to give a solution with a concentration of at least about 0.5% by weight at room temperature (i.e., from about 22° C. to about 26° C.).

The term "insoluble", in reference to a compound or material in a solvent, means that the compound or material can be dissolved in the solvent to give a solution with a concentration of less than 0.01% by weight at room temperature (as defined above).

A "vinylic monomer" refers to a compound that has one sole ethylenically unsaturated group, is soluble in a solvent, and can be polymerized actinically or thermally.

The term "ethylenically unsaturated group" is employed herein in a broad sense and is intended to encompass any groups containing at least one >C═CH$_2$ group. Exemplary ethylenically unsaturated groups include without limitation (meth)acryloyl

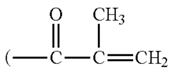 and/or 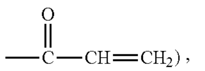

vinyloxycarbonylamino

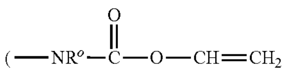

in which R° is H or $C_1$-$C_4$ alkyl), vinyloxycarbonyloxy

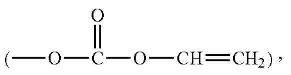

allyl, vinyl, styrenyl, or other C═C containing groups.

As used herein, "actinically" in reference to curing, crosslinking or polymerizing of a polymerizable composition, a prepolymer or a material means that the curing (e.g., crosslinked and/or polymerized) is performed by actinic irradiation, e.g., UV/visible light irradiation, or the like. Thermal curing or actinic curing methods are well-known to a person skilled in the art.

An "acrylic monomer" refers to a vinylic monomer having one sole (meth)acryloyl group. Examples of acrylic monomers includes (meth)acryloxy [or (meth)acryloyloxy] monomers and (meth)acrylamido monomers.

An "(meth)acryloxy monomer" or "(meth)acryloyloxy monomer" refers to a vinylic monomer having one sole group of

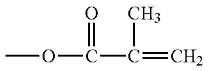 or 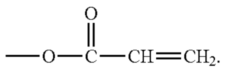

An "(meth)acrylamido monomer" refers to a vinylic monomer having one sole group of

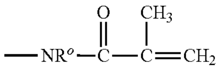 or 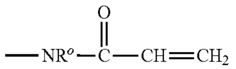

in which R° is H or $C_1$-$C_4$ alkyl.

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group (—CH═CH$_2$) that is directly attached to the nitrogen atom of the amide group.

The term "ene group" refers to a monovalent radical of CH$_2$═CH— or CH$_2$═CCH$_3$— that is not covalently attached to an oxygen or nitrogen atom or a carbonyl group.

An "ene monomer" refers to a vinylic monomer having one sole ene group.

A "vinyloxycarbonylamino monomer" refers to a vinylic monomer having one sole vinyloxycarbonylamino group.

A "vinylaminocarbonyloxy monomer" refers to a vinylic monomer having one sole vinylaminocarbonyloxy group.

A "vinylaminocarbonylamino monomer" refers to a vinylic monomer having one sole vinylaminocarbonylamino group.

A "hydrophilic vinylic monomer" refers to a vinylic monomer which typically yields a homopolymer that is water-soluble or can absorb at least 10 percent by weight of water.

A "hydrophobic vinylic monomer" refers to a vinylic monomer which typically yields a homopolymer that is insoluble in water and can absorb less than 10% by weight of water.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

An "acrylic crosslinker" refers to a vinylic crosslinker having at least two (meth)acryloyl groups.

The term "acrylic repeating units" refers to repeating units of a polymeric material, each of which is derived from an acrylic monomer or crosslinker in a free-radical polymerization to form the polymeric material.

The term "terminal (meth)acryloyl group" refers to one (meth)acryloyl group at one of the two ends of the main chain (or backbone) of an organic compound.

As used in this application, the term "polymer" means a material formed by polymerizing or crosslinking one or more monomers or macromers or prepolymers or combinations thereof.

A "macromer" or "prepolymer" refers to a compound or polymer comprising ethylenically unsaturated groups and has a number average molecular weight of greater than 700 Daltons.

As used in this application, the term "molecular weight" of a polymeric material (including monomeric or macromeric materials) refers to the number-average molecular weight unless otherwise specifically noted or unless testing conditions indicate otherwise. A skilled person knows how to determine the molecular weight of a polymer according to known methods, e.g., GPC (gel permeation chromatography) with one or more of a refractive index detector, a low-angle laser light scattering detector, a multi-angle laser light scattering detector, a differential viscometry detector, a UV detector, and an infrared (IR) detector; MALDI-TOF MS (matrix-assisted laser desorption/ionization time-of-flight mass spectroscopy); $^1$H NMR (Proton nuclear magnetic resonance) spectroscopy, etc.

A "polysiloxane segment" or "polydiorganosiloxane segment" interchangeably refers to a polymer chain segment (i.e., a divalent radical) of

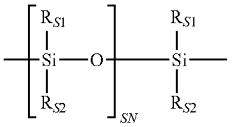

in which SN is an integer of 3 or larger and each of $R_{S1}$ and $R_{S2}$ independent of one another are selected from the group consisting of: $C_1$-$C_0$ alkyl; phenyl; $C_1$-$C_4$-alkyl-substituted phenyl; $C_1$-$C_4$-alkoxy-substituted phenyl; phenyl-$C_1$-$C_6$-alkyl; $C_1$-$C_{10}$ fluoroalkyl; $C_1$-$C_{10}$ fluoroether; aryl; aryl $C_1$-$C_{18}$ alkyl; -alk-$(OC_2H_4)_{\gamma1}$—OR° (in which alk is $C_1$-$C_6$ alkylene diradical, R° is H or $C_1$-$C_4$ alkyl and γ1 is an integer from 1 to 10); a $C_2$-$C_{40}$ organic radical having at least one functional group selected from the group consisting of hydroxyl group (—OH), carboxyl group (—COOH), amino group (—$NR_{N1}R_{N1}'$), amino linkages of —$NR_{N1}$—, amide linkages of —$CONR_{N1}$—, amide of —$CONR_{N1}R_{N1}'$, urethane linkages of —OCONH—, and $C_1$-$C_4$ alkoxy group, or a linear hydrophilic polymer chain, in which $R_{N1}$ and $R_{N1}'$ independent of each other are hydrogen or a $C_1$-$C_{15}$ alkyl; and a photochromic organic radical having a photochromic group.

A "polydiorganosiloxane vinylic monomer" or "polysiloxane vinylic monomer" interchangeably refers to a compound comprising at least one polysiloxane segment and one sole ethylenically-unsaturated groups.

A "polydiorganosiloxane vinylic crosslinker" or "polysiloxane vinylic crosslinker" interchangeably refers to a compound comprising at least one polysiloxane segment and at least two ethylenically-unsaturated groups.

A "linear polydiorganosiloxane vinylic crosslinker" or "linear polysiloxane vinylic crosslinker" interchangeably refers to a compound comprising a main chain which includes at least one polysiloxane segment and is terminated with one ethylenically-unsaturated group at each of the two ends of the main chain.

A "chain-extended polydiorganosiloxane vinylic crosslinker" or "chain-extended polysiloxane vinylic crosslinker" interchangeably refers to a compound comprising at least two ethylenically-unsaturated groups and at least two polysiloxane segments each pair of which are linked by one divalent radical.

The term "photochromic compound" refers to a compound that has one colorless (or light-colored) form and one colored form and can undergo reversible change from the colorless form (or light-colored form) (or so-called "deactivated form") to the colored form (or so-called "activated form") upon exposure to UV or HEVL irradiation.

The term "colorless or light-colored stated" or "inactivated state" in reference to a photochromic contact lens means the original state of the photochromic contact lens before the photochromic contact lens is irradiated with UV and/or HEVL. In this state, the photochromic contact lens typically is colorless or shows a faint color as observed by a naked eye.

The term "colored stated" or "activated state" in reference to a photochromic contact lens means a state of the photochromic contact lens when the photochromic contact lens is being irradiated with UV and/or HEVL. In this state, the photochromic contact lens typically shows a dark color as observed by a naked eye.

The term "fluid" as used herein indicates that a material is capable of flowing like a liquid.

As used in this application, the term "clear" in reference to a polymerizable composition means that the polymerizable composition is a transparent solution or liquid mixture having a light transmissibility of 85% or greater in the range between 400 to 700 nm.

A free radical initiator can be either a photoinitiator or a thermal initiator. A "thermal initiator" or "thermal free radical initiator" interchangeably refers to a chemical that initiates free radical crosslinking/polymerizing reaction by the use of heat energy. A "photoinitiator" refers to a chemical that initiates free radical crosslinking/polymerizing reaction by the use of light.

The term "monovalent radical" refers to an organic radical that is obtained by removing a hydrogen atom from an organic compound and that forms one bond with one other group in an organic compound. Examples include without limitation, alkyl (by removal of a hydrogen atom from an alkane), alkoxy (or alkoxyl) (by removal of one hydrogen atom from the hydroxyl group of an alkyl alcohol), thiyl (by removal of one hydrogen atom from the thiol group of an alkylthiol), cycloalkyl (by removal of a hydrogen atom from a cycloalkane), cycloheteroalkyl (by removal of a hydrogen atom from a cycloheteroalkane), aryl (by removal of a hydrogen atom from an aromatic ring of the aromatic hydrocarbon), heteroaryl (by removal of a hydrogen atom from any ring atom), amino (by removal of one hydrogel atom from an amine), etc.

The term "divalent radical" refers to an organic radical that is obtained by removing two hydrogen atoms from an organic compound and that forms two bonds with other two groups in an organic compound. For example, an alkylene divalent radical (i.e., alkylenyl) is obtained by removal of two hydrogen atoms from an alkane, a cycloalkylene divalent radical (i.e., cycloalkylenyl) is obtained by removal of two hydrogen atoms from the cyclic ring.

In this application, the term "substituted" in reference to an alkyl or an alkylenyl means that the alkyl or the alkylenyl comprises at least one substituent which replaces one hydrogen atom of the alkyl or the alkylenyl and is selected from the group consisting of hydroxyl (—OH), carboxyl (—COOH), —$NH_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

"Post-curing surface treatment", in reference to a SiHy lens bulk material or a SiHy contact lens, means a surface treatment process that is performed after the SiHy lens bulk material or the SiHy contact lens is formed by curing (i.e., thermally or actinically polymerizing) a SiHy lens formulation.

The term "silicone hydrogel lens formulation" or "SiHy lens formulation" interchangeably refers to a polymerizable composition that comprises all necessary polymerizable components for producing a SiHy contact lens or a SiHy lens bulk material.

A "UV-absorbing vinylic monomer" refers to a compound comprising one sole ethylenically-unsaturated group and can absorb predominantly UV lights between 280 nm to 380 nm. It is understood that a UV-absorbing vinylic monomer does not absorb or absorbs negligibly lights having a wavelength greater 400 nm (i.e., having a % T at 400 nm of greater than 90% when tested with a solution of the UV-absorbing vinylic monomer at a concentration of 0.1 mM and a path length of 1 cm).

A "UV/HEVL-absorbing vinylic monomer" refers to a compound comprising one sole ethylenically-unsaturated group and can absorb UV lights between 280 nm and 380 nm and HEVL between 380 nm and 450 nm.

"UVA" refers to radiation occurring at wavelengths between 315 and 380 nanometers; "UVB" refers to radiation occurring between 280 and 315 nanometers; "HEVL" refers to radiation occurring at wavelengths between 380 and 450 nanometers.

"UVA transmittance" (or "UVA % T"), "UVB transmittance" or "UVB % T", and "HEVL-transmittance" or "HEVL % T" are calculated by the following formula.

UVA % $T$=Average % Transmission between 315 nm and 380 nm×100

UVB % $T$=Average % Transmission between 280 nm and 315 nm×100

HEVL % $T$=Average % Transmission between 380 nm and 450 nm×100

HEVL % filtration=100%−HEVL % T

"% T at a wavelength" refers to a percent transmission at the wavelength.

A "derivative" in reference to a Cu(II)-porphyrin means a moiety that is a product of a Cu(II)-porphyrin after being participated in the free-radical polymerization of a polymerizable composition containing the Cu(II)-porphyrin for forming a polymeric material, is covalently attached to the resultant polymeric material, and still has an aromatic π-electronic system substantially similar to the aromatic π-electronic system of the starting Cu(II)-porphyrin as shown by having an intense peak (i.e., Soret peak or band) in the blue wavelength region of the visible spectrum.

The "oxygen permeability", $Dk_i$, of a material is the rate at which oxygen will pass through a material and can be measured at about 34-35° C. according to the procedures described in Example 1. Oxygen permeability is conventionally expressed in units of barrers, where "barrer" is defined as $[(cm^3\ oxygen)(mm)/(cm^2)(sec)(mm\ Hg)]\times10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3\ oxygen)/(cm^2)(sec)(mm\ Hg)]\times10^{-9}$.

The term "modulus" or "elastic modulus" in reference to a contact lens or a material means the tensile modulus or Young's modulus which is a measure of the stiffness of a contact lens or a material. The modulus can be measured according to the procedures described in Example 1.

A "coating" in reference to a contact lens means that the contact lens has, on its surfaces, a thin layer of a material that is different from the bulk material of the contact lens and obtained by subjecting the contact lens to a surface treatment.

"Surface modification" or "surface treatment", as used herein, means that an article has been treated in a surface treatment process, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic vinylic monomers or macromers onto the surface of an article, mold-transfer coating process disclosed in U.S. Pat. No. 6,719,929, the incorporation of wetting agents into a lens formulation for making contact lenses proposed in U.S. Pat. Nos. 6,367,929 and 6,822,016, reinforced mold-transfer coating disclosed in U.S. Pat. No. 7,858,000, and a hydrophilic coating composed of covalent attachment or physical deposition of one or more layers of one or more hydrophilic polymer onto the surface of a contact lens disclosed in U.S. Pat. Nos. 8,147,897, 8,409,599, 8,557,334, 8,529,057, and 9,505,184.

A "hydrophilic surface" in reference to a SiHy material or a contact lens means that the SiHy material or the contact lens has a surface hydrophilicity characterized by having an averaged water contact angle of about 90 degrees or less, preferably about 80 degrees or less, more preferably about 70 degrees or less, more preferably about 60 degrees or less.

An "average contact angle" refers to a water contact angle (static water contact angle measured by Sessile Drop), which is obtained by averaging measurements of at least 3 individual contact lenses.

In this application, a "Cu(II)-meso-aryl-substituted porphyrin" refers to a copper-porphyrin which comprises 4 aryl groups (as substituents) at positions 5, 10, 15 and 20 (i.e., the so-called meso positions) of the porphyrin as known to a person skilled in the art.

In general, the invention is directed to a UV/HEVL-filtering contact lens, more particularly, a UV/HEVL-filtering SiHy contact lens that has a desirable UV/HEVL-absorbing profile including a UVA % T of less than less 10%, UVB % T of less than 1%, a HEVL % T of about 60% or less, a % T at 420 nm of about 40% or less, and a % T at 450 nm of about 80% or greater. The present invention is partly based on the discovery that by selecting and adding a UV-absorbing vinylic monomer, a UV/HEVL-absorbing vinylic monomer and a reactive Cu(II)-porphyrin (preferably a Cu(II)-meso-aryl-substituted porphyrin) in certain amounts and at a selected ratio into a polymerizable composition for making contact lenses, one can obtain UV/HEVL-filtering contact lenses with a desirable UV/HEVL-absorbing profile described above.

A contact lens of the invention not only can provide Class I UV protection against UVA and UVB rays (i.e., filtering more than 90% of UVA and 99% of UVB rays) but also can mimics the natural crystalline lens of a human eye in providing HEVL protection. The natural crystalline lens of a human eye typically blocks most of HEVL light up to 410 nm but its % T filtration performance gradually drop off above this wavelength. It is believed that, like the natural crystalline lens of a human eye, a UV/HEVL-filtering contact lens of the invention could provide improved protections to eye damages from UV and violet lights while providing a minimally-altered color perception, a minimally reduced color vision, a minimized reduction in scotopic visual function, a minimally reduced contrast sensitivity in mesopic and scotopic conditions, and a minimized disruption of circadian photo-entrainment.

The present invention provides a UV/HEVL-filtering contact lens, comprising a bulk hydrogel material that comprises (1) repeating units of at least one hydrophilic vinylic monomer, (2) repeating units of at least one vinylic crosslinker, (3) repeating units of at least one UV-absorbing vinylic monomer that absorbs UV lights between 280 nm and 380 nm; (4) at least one UV/HEVL-absorbing vinylic monomer that absorbs UV lights between 280 nm and 380 nm and HEVL between 380 nm and 450 nm; and (5) derivatives of at least one Cu(II)-porphyrin, wherein the derivatives are covalently attached to the bulk hydrogel material and have an absorption peak in a region from 395 nm to 435 nm (i.e., a Soret peak or band) in visible absorption spectrum, wherein said components (3), (4) and (5) are present in the bulk hydrogel material in amounts and at a ratio for rendering the UV/HEVL-filtering contact lens to have a UVA % T of less than less 10%, UVB % T of less than 1%, a HEVL % T of about 60% or less (preferably about 55% or less, more preferably about 50% or less, even more preferably about 45 or less), a % T at 420 nm of about 40% or less (preferably about 30% or less, more preferably about 25% or less, even more preferably about 20% or less), and a % T of about 80% or greater (preferably about 85% or greater, more preferably about 90% or greater) at any wavelength between 450 nm and 500 nm.

In accordance with the invention, any UV-absorbing vinylic monomers can be used in the invention, so long as they can provide Class I UV protection in combination with UV/HEVL-absorbing vinylic monomer. UV-absorbing vinylic monomers can be benzotriazole-containing vinylic monomers (i.e., ones each having a benzotriazole-moiety) and/or benzophenone-containing vinylic monomers (i.e., ones each having a benzophenone-moiety) known to a person skilled in the art.

Examples of benzophenone-containing vinylic monomers includes without limitation: 2-hydroxy-4-acryloxy benzophenone; 2-hydroxy-4-methacryloxy benzophenone; 2-hydroxy-4-acryloxyethoxy benzophenone; 2-hydroxy-4-methacryloxyethoxy benzophenone; 4-allyloxy-2-hydroxybenzophenone; 4-allyloxyethoxy-2-hydroxybenzophenone; those amino-benzophenone vinylic monomers (e.g., N-(2-benzoyl-4-chlorophenyl)methacrylamide, etc.) disclosed in U.S. Pat. No. 10,268,053, 2-hydroxy-4-methoxy-4'-(acrylamido-N,N-dimethypropylaminomethyl)-benzophenone and other hydroxy-benzophenone vinylic monomers disclosed in U.S. patent Ser. No. 10/254,567, those benzophenone-containing UV-absorbing vinyl monomers disclosed in U.S. Pat. No. 3,162,676. Benzophenone-containing vinylic monomers can be obtained from commercial suppliers or prepared according to the procedures described in U.S. Pat. Nos. 3,162,676, 10,254,567, and 10,268,053.

In a preferred embodiment, said at least one UV-absorbing vinylic monomer comprises a benzotriazole-containing vinylic monomer, preferably a vinylic monomer of formula (1)

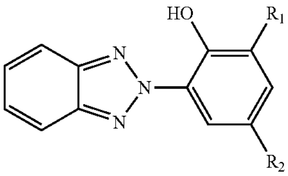

(1)

in which: one of $R_1$ and $R_2$ is H while the other of $R_1$ and $R_2$ is a monovalent radical of $-L_1-E_1$; $E_1$ is vinyl, vinyloxy, allyl, allyloxy, (meth)acryloxy, or (meth)acrylamido; $L_1$ is a direct bond, a $C_1$-$C_6$ alkylene divalent radical, or a linkage of $-L_2-X_1-L_3-$; $L_2$ is a direct bond, a $C_1$-$C_3$ alkylene divalent radical,

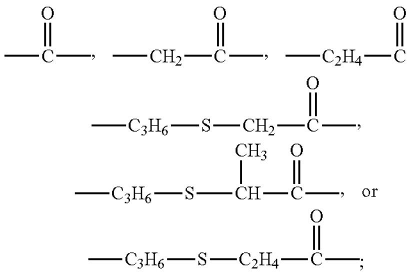

or $X_1$ is O, NH, or

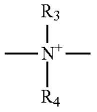

in which $R_3$ and $R_4$ are methyl or ethyl; $L_3$ is a $C_1$-$C_6$ alkylene divalent radical.

Preferred examples of UV-absorbing vinylic monomers of formula (1) include without limitation 2-(2'-hydroxy-5'-vinylphenyl)-2H-benzotriazole, 2-(2'-hydroxy-5'-methacryloxyphenyl)-2H-benzotriazole, 2-(2'-hydroxy-5'-acryloyloxyphenyl)-2H-benzotriazole, 2-[2'-hydroxy-5'-(2-methacryloxyethyl)phenyl)]-2H-benzotriazole (Norbloc), 2-[2'-hydroxy-5'-(2-acryloxyethyl)-phenyl)]-2H-benzotriazole, 2-(2'-hydroxy-5'-methacryloxypropylphenyl)-2H-benzotriazole, 2-(2'-hydroxy-5'-acryloxypropylphenyl)-2H-benzotriazole.

Benzotriazole-containing UV-absorbing vinyl monomers can be prepared according to procedures described in U.S. Pat. Nos. 3,299,173, 4,612,358, 4,716,234, 4,528,311, 10,254,567 or can be obtained from commercial suppliers.

In accordance with the invention, any UV/HEVL-absorbing vinylic monomers can be used in the invention, so long as they can provide a desired HEVL-filtering profile in combination with Cu(II)-porphyrin. UV/HEVL-absorbing vinylic monomers can be benzotriazole-containing vinylic monomers and/or benzophenone-containing vinylic monomer (i.e., one having a benzophenone-moiety) known to a person skilled in the art.

In a preferred embodiment, said at least one UV/HEVL-absorbing vinylic monomer comprises a benzotriazole-containing vinylic monomer, preferably a benzotriazole-containing vinylic monomer of formula (2)

(2)

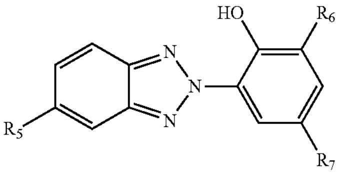

in which: $R_5$ is H, F, Cl, $CF_3$, $CCl_3$, $CH_3$, or $OCH_3$; one of $R_6$ and $R_7$ is H, $OCH_3$, F, Cl, $CF_3$, $CCl_3$, or a $C_1$-$C_{10}$ alkyl while the other of $R_6$ and $R_7$ is a monovalent radical of $-L_1-E_1$; $E_1$ is vinyl, vinyloxy, allyl, allyloxy, (meth)acryloxy, or (meth)acrylamido; $L_1$ is a direct bond, a $C_1$-$C_6$ alkylene divalent radical, or a linkage of $-L_2-X_1-L_3-$; $L_2$ is a direct bond, a $C_1$-$C_3$ alkylene divalent radical,

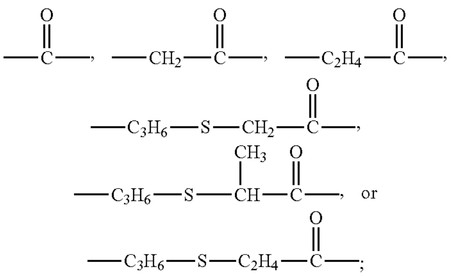

$X_1$ is O, NH, or

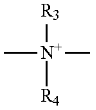

in which $R_3$ and $R_4$ are methyl or ethyl; $L_3$ is a $C_1$-$C_6$ alkylene divalent radical, provided that at least two of $R_5$, $R_6$ and $R_7$ are not H.

Examples of preferred UV/HEVL-absorbing vinylic monomers of formula (2) include without limitation: 2-(2'-hydroxy-3'-methacrylamidomethyl-5'-tert-octylphenyl)-2H-benzotriazole, 2-(2'-hydroxy-5'-methacrylamidophenyl)-5-chlorobenzotriazole, 2-(2'-hydroxy-5'-methacrylamido-phenyl)-5-methoxybenzotriazole, 2-(2'-hydroxy-5'-methacryloxypropyl-3'-t-butyl-phenyl)-5-chlorobenzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl) benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxy-phenol (WL-8), 2-{2'-Hydroxy-3'-tert-butyl-5'-[3"-(4"-vinylbenzyloxy)propoxy]phenyl}-5-methoxy-2H-benzotriazole, 2-(5-chloro-2H-benzotriazol-2-yl)-6-(1,1-dimethylethyl)-4-ethenyl-phenol (UVAM), 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-[3'-t-butyl-2'-hydroxy-5'-(3"-dimethylvinylsilylpropoxy)-2'-hydroxy-phenyl)]-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); 2-(5-chloro-2H-benzotriazol-2-yl)-6-methoxy-4-(2-propen-1-yl)-phenol (CAS #1260141-20-5); 2-[2-Hydroxy-5-[3-(methacryloyloxy)propyl]-3-tert-butylphenyl]-5-chloro-2H-benzotriazole; those benzotriazole-containing vinylic monomers disclosed in U.S. patent Ser. No. 10/254,567.

In accordance with the invention, the derivatives of said at least one Cu(II)-porphyrin derivative have a Soret peak (i.e., an absorption peak in a region from 395 nm to 435 nm) in visible absorption spectrum.

Any Cu(II)-porphyrin can be used in the invention, so long as it can be participate in free radical polymerization of a polymerizable composition including the Cu(II)-porphyrin to yield a Cu(II)-porphyrin derivative that is covalently attached to the resultant polymeric material formed from the polymerizable composition and still has a Soret peak (i.e., an absorption peak in a region from 395 nm to 435 nm) in visible absorption spectrum.

Preferably, Cu(II)-porphyrin is a Cu(II)-meso-aryl-substituted porphyrin. It is believed that the aromatic π-electronic system of a Cu(II)-meso-aryl-substituted porphyrin could survive in free radical polymerization and the Cu(II)-meso-aryl-substituted porphyrin derivative from free radical polymerization can still have a Soret peak (i.e., an absorption peak in a region from 395 nm to 435 nm) in visible absorption spectrum.

In a preferred embodiment, the Cu(II)-meso-aryl-substituted porphyrin is represented by formula (3)

(3)

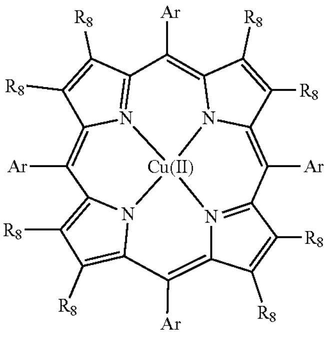

-continued

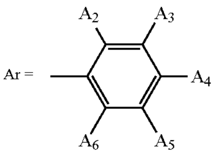

in which:

each $R_8$ is independently H, Cl, F, substituted or unsubstituted $C_1$-$C_{20}$ alkyl, substituted or unsubstituted $C_1$-$C_{20}$ alkenyl, substituted or unsubstituted $C_1$-$C_{20}$ alkynyl, or two adjacent $R_8$ groups, together with the atoms to which they are attached, form a substituted or unsubstituted $C_6$-$C_{14}$ aryl, substituted or unsubstituted $C_3$-$C_{14}$ carbocyclyl, substituted or unsubstituted $C_5$-$C_{14}$ heteroaryl, or substituted or unsubstituted $C_3$-$C_{14}$ heterocyclyl;

$A_2$, $A_3$, $A_4$, $A_5$, and $A_6$ independent of each other are H, Cl, F, $CCl_3$, $CF_3$, $CH_3$, $CH(CH_3)_2$, $C(CH_3)_3$, $OCH_3$, OH, $NO_2$, or a monovalent radical of $-L_1-E_1$;

$E_1$ is vinyl, vinyloxy, allyl, allyloxy, (meth)acryloxy, or (meth)acrylamido;

$L_1$ is a direct bond, a $C_1$-$C_6$ alkylene divalent radical, or a linkage of $-L_2-X_1-L_3-$; $L_2$ is a direct bond, a $C_1$-$C_3$ alkylene divalent radical,

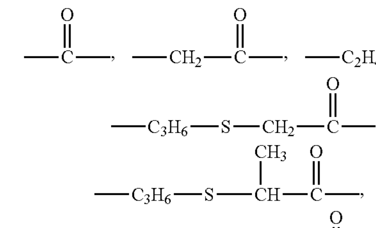

or

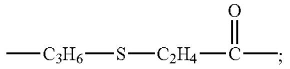

$X_1$ is O, NH, or

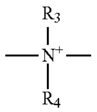

in which $R_3$ and $R_4$ are methyl or ethyl;

$L_3$ is a $C_1$-$C_6$ alkylene divalent radical, provided that one of $A_2$, $A_3$, $A_4$, $A_5$, and $A_6$ is a monovalent radical of $-L_1-E_1$.

Because of the presence of ethylenically unsaturated groups, a Cu(II)-meso-aryl-substituted porphyrin of formula (3) can be added in a polymerizable composition for making UV/HEVL-filtering contact lenses of the invention.

Examples of preferred Cu(II)-meso-aryl-substituted porphyrins of formula (3) include without limitation those disclosed in U.S. Pat. Appl. No. 63/275,159. They can be obtained from commercial sources (e.g., High Performance Optics, Inc.) or prepared according to the procedures described in U.S. Pat. Appl. No. 63/275,159.

In another preferred embodiment, the Cu(II)-meso-aryl-substituted porphyrin is represented by formula (4)

(4)

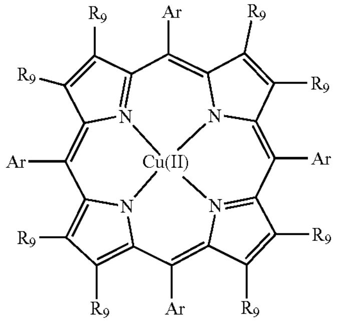

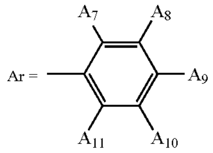

in which:

each $R_9$ is independently H, Cl, F, substituted or unsubstituted $C_1$-$C_{20}$ alkyl, substituted or unsubstituted $C_1$-$C_{20}$ alkenyl, substituted or unsubstituted $C_1$-$C_{20}$ alkynyl, or two adjacent Ra groups, together with the atoms to which they are attached, form a substituted or unsubstituted $C_6$-$C_{14}$ aryl, substituted or unsubstituted $C_3$-$C_{14}$ carbocyclyl, substituted or unsubstituted $C_5$-$C_{14}$ heteroaryl, or substituted or unsubstituted $C_3$-$C_{14}$ heterocyclyl;

$A_7$ and $A_{11}$ independent of each other are Cl, F, $CCl_3$, $CF_3$, $CH_3$, $CH(CH_3)_2$, $C(CH_3)_3$, $OCH_3$, OH, or $NO_2$ (preferably Cl, F, or $NO_2$);

$A_8$, $A_9$ and $A_{10}$ independent of one another are H, Cl, F, $CCl_3$, $CF_3$, $CH_3$, $CH(CH_3)_2$, $C(CH_3)_3$, $OCH_3$, OH, $NH_2$, or $NO_2$.

In a preferred embodiment, $A_7$, $A_8$, $A_9$, $A_{10}$, and $A_{11}$ are identical to one other and are Cl or F; In another preferred embodiment, $A_7$ and $A_{11}$ independent of each other are Cl or F; As and $A_{10}$ are H; and $A_8$ is Cl, F, $CCl_3$, $CF_3$, $CH_3$, $CH(CH_3)_2$, $C(CH_3)_3$, $OCH_3$, OH, $NH_2$, or $NO_2$. In another preferred embodiment, $A_7$ and $A_{11}$ independent of each other are C or F; $A_8$ and $A_{10}$ are H; and $A_8$ is C, F, $CCl_3$, $CF_3$, $CH_3$, $CH(CH_3)_2$, $C(CH_3)_3$, $OCH_3$, OH, $NH_2$, or $NO_2$.

Examples of preferred Cu(II)-meso-aryl-substituted porphyrins of formula (4) include without limitation 5,10,15,20-tetrakis(2, 6-dichlorophenyl)-porphyrin-Cu(II), 5,10,15,20-tetrakis(2, 6-difluorophenyl)-porphyrin-Cu(II), 5,10,15,20-tetrakis(2-chloro-6-fluorophenyl)-porphyrin-Cu(II), 5,10,15,20-tetrakis(2, 6-dinitrophenyl)-porphyrin-Cu(II), 5,10,15,20-tetrakis(2,3,6-trichlorophenyl)-porphyrin-Cu (II), 5,10,15,20-tetrakis(2,3,6-trifluorophenyl)-porphyrin-Cu(II), 5,10,15,20-tetrakis(2,4,6-trinitrophenyl)-porphyrin-Cu(II), 5,10,15,20-tetrakis(2,4,6-trimethylphenyl)-porphyrin-Cu(II), 5,10,15,20-tetrakis(2,6-dichloro-3-aminophenyl)-porphyrin-Cu(II), 5,10,15,20-tetrakis(4-bromo-2,6-dichlorophenyl)-porphyrin-Cu(II), 5,10,15,20-tetrakis(2,6-dichloro-4-nitrophenyl)-porphyrin-Cu(II), 5,10,15,20-tetrakis(2,6-dichloro-3-nitrophenyl)-porphyrin-Cu (II), 5,10,15,20-tetrakis(2, 6-dihydroxyphenyl)-porphyrin-Cu(II), 5,10,15,20-tetrakis(2, 6-dimethoxyphenyl)-porphyrin-Cu(II), 5,10,15,20-tetrakis(pentachlorophenyl)-porphyrin-Cu(II), 5,10,15,20-tetrakis(pentafluorophenyl)-porphyrin-Cu(II), 10,15,20-tris(2,6-dichlorophenyl)-5-(2,3,4,5,6-pentafluorophenyl)-porphyrin-Cu(II), 5,10,15-tris (pentafluorophenyl)-20-(2,6-dichlorophenyl)-porphyrin-Cu (II), and 10,20-bis(2,6-dichlorophenyl)-5,15-bis(2,3,4,5,6-pentafluorophenyl)-porphyrin-Cu(II).

It is found that Cu(II)-meso-aryl-substituted porphyrin (e.g., 5,10,15,20-tetrakis-(2,6-dichlorophenyl)-porphyrin-Cu(II)) can participate in the free radical polymerization of a polymerizable composition comprising a sufficient amount of at least one N-vinyl amide monomer (e.g., N-vinylpyrrolidone), even though such a Cu(II)-meso-aryl-substituted porphyrin is free of any ethylenically unsaturated group. It is also discovered that the properties of the resultant polymeric materials are not adversely and significantly affected by the participation of the Cu(II)-meso-aryl-substituted porphyrin in the free radical polymerization. Resultant polymeric materials with Cu(II)-meso-aryl-substituted porphyrin grafted thereonto still exhibit HEVL-filtering (i.e., HEVL-absorbing) property substantially similar to that of the starting Cu(II)-meso-aryl-substituted porphyrin, indicating no significant decomposition or no damages to the aromatic π-electronic system of Cu(II)-meso-aryl-substituted porphyrin during the free radical polymerization. According to the present invention, there is no need for chemically modifying HEVL-absorbing compounds to introduce one or more ethylenically unsaturated groups.

In accordance with a preferred embodiment of the invention, the bulk hydrogel material (in dried state) of UV/HEVL-filtering contact lens comprises from about 0.6% to about 3.5%, preferably from about 0.7% to about 3.0%, more preferably from about 0.8% to about 2.5% by weight of all components (3), (4) and (5). It is understood that weight percentages of components (3), (4) and (5) in the bulk hydrogel material in dried state can be determined based on their weight percentages in a polymerizable composition for forming the bulk hydrogel material, relative to total weight of all polymerizable components in the polymerizable composition.

In a preferred embodiment, in the bulk hydrogel material in dried state weight ratio of component (3) over component (4) is at least 1.2 (preferably at least 1.6, more preferably at least 2.0, even more preferably at least 2.4); and weight ratio of component (4) over component (5) is at least 1.5 (preferably at least 2.0, more preferably at least 2.5, even more preferably at least 3.0). It is understood that weight ratios of components (3) to (4) to (5) in the bulk hydrogel material in dried state can be determined based on their weight percentages in a polymerizable composition for forming the bulk hydrogel material, relative to total weight of all polymerizable components in the polymerizable composition.

With such weight ratios of components (3) to (4) to (5) in the bulk hydrogel material in dried state, a UV/HEVL-absorbing contact lens may provide Class I UV protection and an enhanced HEVL protection while minimizing their effects on color balance, color vision and tinting color.

Any hydrophilic vinylic monomers can be used in the invention. Examples of preferred hydrophilic vinylic monomers are alkyl (meth)acrylamides (as described later in this application), hydroxyl-containing acrylic monomers (as described below), amino-containing acrylic monomers (as described later in this application), carboxyl-containing acrylic monomers (as described later in this application), N-vinyl amide monomers (as described later in this application), methylene-containing pyrrolidone monomers (i.e., pyrrolidone derivatives each having a methylene group connected to the pyrrolidone ring at 3- or 5-position) (as described later in this application), acrylic monomers having a $C_1$-$C_4$ alkoxyethoxy group (as described later in this application), vinyl ether monomers (as described later in this application), allyl ether monomers (as described later in this application), phosphorylcholine-containing vinylic monomers (as described later in this application), N-2-hydroxyethyl vinyl carbamate, N-carboxyvinyl-β-alanine (VINAL), N-carboxyvinyl-α-alanine, and combinations thereof.

In one embodiment, the bulk hydrogel material is a non-silicone hydrogel material; said at least one hydrophilic vinylic monomer comprises at least one hydroxyl-containing acrylic monomer (any one of those described later in this application), at least one hydrophilic (meth)acrylamido monomer (any one of those described later in this application), at least one N-vinyl amide monomer (any one of those described later in this application), at least one methylene-containing pyrrolidone monomer (any one of those described later in this application), or combinations thereof; and said at least one vinylic crosslinker comprises at least one non-silicone vinylic crosslinker.

Examples of preferred hydrophilic N-vinyl amide monomers include without limitation N-vinylpyrrolidone, N-vinyl piperidone, N-vinyl caprolactam, N-vinyl-N-methyl acetamide, N-vinyl formamide, N-vinyl acetamide, N-vinyl isopropylamide, N-vinyl-N-methyl acetamide, N-vinyl-N-ethyl acetamide, N-vinyl-N-ethyl formamide, and mixtures thereof. Preferably, the N-vinyl amide monomer is N-vinylpyrrolidone, N-vinyl-N-methyl acetamide, or combinations thereof.

In accordance with the invention, any non-silicone vinylic crosslinkers can be in this invention. Examples of preferred non-silicone vinylic cross-linking agents are described later in this application.

In another embodiment, the bulk hydrogel material is a silicone hydrogel material and further comprises (6) repeating units of at least one siloxane-containing vinylic monomer and/or at least one polysiloxane vinylic crosslinker; and said at least one vinylic crosslinker comprises said polysiloxane vinylic crosslinker and/or at least one non-silicone vinylic crosslinker.

Any siloxane-containing vinylic monomer can be used in the invention. Examples of preferred siloxane-containing vinylic monomers can be siloxane-containing (meth)acrylamido monomers, siloxane-containing (meth)acryloxy monomers, siloxane-containing vinyloxycarbonyloxy monomers, siloxane-containing vinyloxycarbonylamino monomers, siloxane-containing vinylaminocarbonylamino monomers, or siloxane-containing vinylaminocarbonyloxy monomers, each of which comprises a bis(trialkylsilyloxy) alkylsilyl group, a tris(trialkylsilyloxy)-silyl group, or a polysiloxane chain having 2 to 30 siloxane units and terminated with an alkyl, hydroxyalkyl or methoxyalkyl group. Such preferred siloxane-containing vinylic monomers can be obtained from the commercial suppliers, or alternatively prepared according to known procedures, e.g., similar to those described in U.S. Pat. Nos. 5,070,215, 6,166,236, 6,867,245, 7,214,809, 8,415,405, 8,475,529, 8,614,261, 8,658,748, 9,097,840, 9,103,965, 9,217,813, 9,315,669, and 9,475,827, or by reacting a vinylic monomer having a reactive functional group (e.g., an acid chloride, acid anhydride, carboxyl, hydroxyl, amino, epoxy, isocyanate, aziridine, azlactone, or aldehyde group) with a siloxane-containing compound having a reactive group selected from the group consisting of a hydroxyalkyl, an aminoalkyl, an alkylaminoalkyl, a carboxyalkyl, an isocyanatoalkyl, an epoxyalkyl, and an aziridinylalkyl, in the presence or absence of a coupling agent under coupling reaction conditions well known to a person skilled in the art.

In accordance with the invention, any polysiloxane vinylic crosslinkers can be used in this invention. Examples of preferred polysiloxane vinylic crosslinkers include without limitation α,ω-(meth)acryloxy-terminated polydimethylsiloxanes of various molecular weight; α,ω-(meth)acrylamido-terminated polydimethylsiloxanes of various molecular weight; α,ω-vinyl carbonate-terminated polydimethylsiloxanes of various molecular weight; α,ω-vinyl carbamate-terminated polydimethylsiloxane of various molecular weight; bis-3-methacryloxy-2-hydroxypropyloxypropyl polydimethylsiloxane of various molecular weight; N,N,N',N'-tetrakis(3-methacryloxy-2-hydroxypropyl)-alpha,omega-bis-3-aminopropyl-polydimethylsiloxane of various molecular weight; the reaction products of glycidyl methacrylate with amino-functional polydimethylsiloxanes; the reaction products of an azlactone-containing vinylic monomer (any one of those described above) with hydroxyl-functional polydimethylsiloxanes; polysiloxane-containing macromer selected from the group consisting of Macromer A, Macromer B, Macromer C, and Macromer D described in U.S. Pat. No. 5,760,100; polysiloxane vinylic crosslinkers disclosed in U.S. Pat. Nos. 4,136,250, 4,153,641, 4,182,822, 4,189,546, 4,259,467, 4,260,725, 4,261,875, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,449,729, 5,451,617, 5,486,579, 5,962,548, 5,981,675, 6,039,913, 6,762,264, 7,423,074, 8,163,206, 8,480,227, 8,529,057, 8,835,525, 8,993,651, 9,187,601, 10,081,697, 10,301,451, and 10,465,047.

One class of preferred polysiloxane vinylic crosslinkers are di-(meth)acryloyloxy-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups, more preferably a polysiloxane vinylic crosslinker of formula (H), are described later in this application and can be prepared according to the procedures disclosed in U.S. patent Ser. No. 10/081,697.

Another class of preferred polysiloxane vinylic crosslinkers are vinylic crosslinkers each of which comprises one sole polysiloxane segment and two terminal (meth)acryloyl groups, which can be obtained from commercial suppliers; prepared by reacting glycidyl (meth)acrylate (meth)acryloyl chloride with a di-amino-terminated polydimethylsiloxane or a di-hydroxyl-terminated polydimethylsiloxane; prepared by reacting isocyantoethyl (meth)acrylate with di-hydroxyl-terminated polydimethylsiloxanes prepared by reacting an amino-containing acrylic monomer with di-carboxyl-terminated polydimethylsiloxane in the presence of a coupling agent (a carbodiimide); prepared by reacting a carboxyl-containing acrylic monomer with di-amino-terminated polydimethylsiloxane in the presence of a coupling agent (a carbodiimide); or prepared by reacting a hydroxyl-containing acrylic monomer with a dihydroxy-terminated polydisiloxane in the presence of a diisocyanate or diepoxy coupling agent.

Other classes of preferred polysiloxane vinylic crosslinkers are chain-extended polysiloxane vinylic crosslinkers each of which has at least two polysiloxane segments linked by a linker between each pair of polysiloxane segments and two terminal ethylenically unsaturated groups, which can be prepared according to the procedures described in U.S. Pat. Nos. 5,034,461, 5,416,132, 5,449,729, 5,760,100, 7,423,074, 8,529,057, 8,835,525, 8,993,651, 9,187,601, 10,301,451, and 10,465,047.

The bulk non-silicone hydrogel material or the bulk silicone hydrogel material can further comprise repeating units of at least one hydrophobic non-silicone vinylic monomer.

Any hydrophobic non-silicone vinylic monomers can be in this invention. Examples of preferred hydrophobic non-silicone vinylic monomers include $C_1$-$C_{10}$ alkyl (meth)acrylate (e.g., methyl (meth)acrylate, ethyl (meth)acrylate, propyl (meth)acrylate, isopropyl (meth)acrylate, 2-ethylhexyl (meth)acrylate, etc.), cyclohexyl (meth)acrylate, vinyl acetate, vinyl propionate, vinyl butyrate, vinyl valerate, styrene, chloroprene, vinyl chloride, vinylidene chloride, (meth)acrylonitrile, 1-butene, butadiene, vinyl toluene, vinyl ethyl ether, perfluorohexylethyl-thio-carbonyl-aminoethyl-methacrylate, isobornyl (meth)acrylate, trifluoroethyl (meth)acrylate, hexafluoro-isopropyl (meth)acrylate, hexafluorobutyl (meth)acrylate, and combinations thereof.

In a preferred embodiment, a bulk hydrogel material comprises repeating units of at least one polymerizable dye for tinting the bulk hydrogel material. Examples of preferred polymerizable dyes include without limitation 1,4-bis(4-(2-methacryloxyethyl)phenylamino) anthraquinone (Reactive Blue 246), 1,4-bis((2-hydroxyethyl)amino)-9,10-anthracenedione-bis(2-propenoic)ester (Reactive Blue 247).

In accordance with the invention, the lens bulk material of a contact lens of the invention can be derived directly from a preformed contact lens. A preformed contact lens can be any contact lens which has not been subjected to any surface treatment after being produced according to any lens manufacturing processes, any contact lens which has been plasma treated, or any commercial contact lens, so long as it does not have a water gradient structural configuration. A person skilled in the art knows very well how to make preformed contact lenses. A person skilled in the art knows very well how to make preformed contact lenses. For example, preformed contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of polymeric material buttons as used in making customized contact lenses. In cast-molding, a polymerizable composition (i.e., a lens formulation) typically is dispensed into molds and cured (i.e., polymerized and/or crosslinked) in molds for making contact lenses.

Lens molds for making contact lenses including SiHy contact lenses are well known to a person skilled in the art and, for example, are employed in cast molding or spin casting. For example, a mold (for cast molding) generally comprises at least two mold sections (or portions) or mold halves, i.e., first and second mold halves. The first mold half defines a first molding (or optical) surface and the second mold half defines a second molding (or optical) surface. The first and second mold halves are configured to receive each other such that a lens-forming cavity is formed between the first molding surface and the second molding surface. The molding surface of a mold half is the cavity-forming surface of the mold and in direct contact with the polymerizable composition.

The mold halves can be formed through various techniques, such as injection molding. Methods of manufacturing mold halves for cast-molding a contact lens are generally well known to those of ordinary skill in the art. The process of the present invention is not limited to any particular method of forming a mold. In fact, any method of forming a mold can be used in the present invention. The mold halves can be formed through various techniques, such as injection molding or lathing. Examples of suitable processes for forming the mold halves are disclosed in U.S. Pat. Nos. 4,444,711; 4,460,534; 5,843,446; and 5,894,002.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used. Other materials that allow UV light transmission could be used, such as quartz glass and sapphire.

In accordance with the invention, a polymerizable composition can be introduced (dispensed) into a cavity formed by a mold according to any known methods.

After the polymerizable composition is dispensed into the mold, it is polymerized to produce a contact lens. Crosslinking may be initiated thermally or actinically to crosslink the polymerizable components in the polymerizable composition.

The thermal polymerization is carried out conveniently, for example at a temperature of from 25 to 120° C. and preferably 40 to 100° C. The reaction time may vary within wide limits, but is conveniently, for example, from 30 minutes to 4 hours or preferably from 1 to 2 hours. It is advantageous to previously degas the components and solvents used in the polymerization reaction and to carry out said copolymerization reaction under an inert atmosphere, for example under a nitrogen or argon atmosphere.

The actinic polymerization can then be triggered off by actinic radiation, for example light, in particular UV light or visible light of a suitable wavelength. The spectral requirements can be controlled accordingly, if appropriate, by addition of suitable photosensitizers.

After the curing step, the steps of opening a mold (i.e., separating the male mold half from the female mold half with the contact lens attached onto one of the male and female mold halves and delensing (i.e., removing the contact lens from the lens adhered mold half) are carried out according to any techniques known to a person skilled in the art.

After the molded contact lens is delensed, it typically is extracted with an extraction medium as well known to a person skilled in the art. The extraction liquid medium is any solvent capable of dissolving the diluent(s), unpolymerized polymerizable materials, and oligomers in the lens precursor. Water, any organic solvents described above or known to a person skilled in the art, or a mixture thereof can be used in the invention.

The extracted contact lens can then be hydrated according to any method known to a person skilled in the art.

The extracted and/or hydrated contact lens can further subject to further processes, such as, for example, surface treatment, packaging in lens packages with a packaging solution which is well known to a person skilled in the art; sterilization such as autoclave at from 118 to 124° C. for at least about 30 minutes; and the like.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

In accordance with the invention, a bulk non-silicone hydrogel material can be formed from a polymerizable composition (i.e., lens formulation) for forming a non-silicone hydrogel contact lens. Typically, a polymerizable composition for forming a bulk non-silicone hydrogel material of the invention is either (I) a monomer mixture comprising (1) at least one hydrophilic vinylic monomer (e.g., hydroxyl-containing vinylic monomer, N-vinyl amide monomer, (meth)acrylamido monomer, or combinations thereof), (2) at least one non-silicone vinylic crosslinker, (3) at least one UV-absorbing vinylic monomer, (4) at least one UV/HEVL-absorbing vinylic monomer, (5) at least one Cu(II)-porphyrin, and (6) at least one component selected from the group consisting of a hydrophobic non-silicone vinylic monomer, a free-radical initiator (photoinitiator or thermal initiator), a polymerizable visibility tinting agent (i.e., a polymerizable dye), and combinations thereof; or (II) an aqueous solution comprising one or more water-soluble prepolymers, at least one UV-absorbing vinylic monomer, at least one UV/HEVL-absorbing vinylic monomer, at least one Cu(II)-porphyrin, and a small amount of at least one component selected from the group consisting of hydrophilic vinylic monomer, a non-silicone vinylic crosslinker, a hydrophobic non-silicone vinylic monomer, a free-radical initiator (photoinitiator or thermal initiator), a polymerizable visibility tinting agent (i.e., a polymerizable dye), and combinations thereof.

Examples of water-soluble prepolymers include without limitation: a water-soluble crosslinkable poly(vinyl alcohol) prepolymer described in U.S. Pat. Nos. 5,583,163 and 6,303,687; a water-soluble vinyl group-terminated polyurethane prepolymer described in U.S. Pat. No. 6,995,192; derivatives of a polyvinyl alcohol, polyethyleneimine or polyvinylamine, which are disclosed in U.S. Pat. No. 5,849,841; a water-soluble crosslinkable polyurea prepolymer described in U.S. Pat. Nos. 6,479,587 and 7,977,430; crosslinkable polyacrylamide; crosslinkable statistical copolymers of vinyl lactam, MMA and a comonomer, which are disclosed in U.S. Pat. No. 5,712,356; crosslinkable copolymers of vinyl lactam, vinyl acetate and vinyl alcohol, which are disclosed in U.S. Pat. No. 5,665,840; polyether-polyester copolymers with crosslinkable side chains which are disclosed in U.S. Pat. No. 6,492,478; branched polyalkylene glycol-urethane prepolymers disclosed in U.S. Pat. No. 6,165,408; polyalkylene glycol-tetra(meth)acrylate prepolymers disclosed in U.S. Pat. No. 6,221,303; crosslinkable polyallylamine gluconolactone prepolymers disclosed in U.S. Pat. No. 6,472,489.

Numerous lens formulations (polymerizable composition) for forming non-silicone hydrogel materials have been described in numerous patents and patent applications published by the filing date of this application and have been used in producing commercial non-silicone hydrogel contact lenses. Examples of commercial non-silicone hydrogel contact lenses include, without limitation, alfafilcon A, acofilcon A, deltafilcon A, etafilcon A, focofilcon A, helfilcon A, helfilcon B, hilafilcon B, hioxifilcon A, hioxifilcon B, hioxifilcon D, methafilcon A, methafilcon B, nelfilcon A, nesofilcon A, ocufilcon A, ocufilcon B, ocufilcon C, ocufilcon D, omafilcon A, phemfilcon A, polymacon, samfilcon A, telfilcon A, tetrafilcon A, and vifilcon A. They can be used as a base formulation for preparing a polymerizable composition for forming a bulk non-silicone hydrogel material of the invention by adding at least one UV-absorbing vinylic monomer, at least one UV/HEVL-absorbing vinylic monomer, at least one Cu(II)-porphyrin in the base formulation.

Preferably, a bulk non-silicone hydrogel material comprises at least 50% by mole of repeating units of at least one hydroxyl-containing vinylic monomer, preferably selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, vinyl alcohol, allyl alcohol, and combinations thereof, more preferably selected from the group consisting of hydroxyethyl (meth)acrylate, glycerol (meth)acrylate, hydroxyethyl (meth)acrylamide, and vinyl alcohol.

In accordance with the invention, a bulk silicone hydrogel material can be formed from a lens formulation (i.e., a polymerizable composition) for forming a silicone hydrogel contact lens. Typically, a polymerizable composition for forming a bulk silicone hydrogel material of the invention comprises: (1) at least one hydrophilic vinylic monomer (e.g., at least one hydroxyl-containing acrylic monomer, at least one N-vinyl amide monomer, at least one (meth) acrylamido monomer, at least one methylene-containing pyrrolidone monomer, or combinations thereof), (2) at least one vinylic crosslinker that comprises at least one polysiloxane vinylic crosslinker and/or at least one non-silicone vinylic crosslinker, (3) at least one UV-absorbing vinylic monomer, (4) at least one UV/HEVL-absorbing vinylic monomer, (5) at least one Cu(II)-porphyrin, (6) at least one siloxane-containing vinylic monomer, and (7) at least one component selected from the group consisting of a hydrophobic non-silicone vinylic monomer, a free-radical initiator (photoinitiator or thermal initiator), a polymerizable visibility tinting agent (i.e., a polymerizable dye), and combinations thereof.

Numerous lens formulations for forming silicone hydrogel contact lenses have been described in numerous patents and patent applications published by the filing date of this application and have been used in producing commercial SiHy contact lenses. Examples of commercial SiHy contact lenses include, without limitation, asmofilcon A, balafilcon A, comfilcon A, delefilcon A, efrofilcon A, enfilcon A, fanfilcon A, galyfilcon A, lotrafilcon A, lotrafilcon B, narafilcon A, narafilcon B, senofilcon A, senofilcon B, senofilcon C, smafilcon A, somofilcon A, and stenfilcon A. They can be used as a base formulation for forming a polymerizable composition for forming a bulk silicone hydrogel material of the invention by adding at least one UV-absorbing vinylic monomer, at least one UV/HEVL-absorbing vinylic monomer, at least one Cu(II)-porphyrin in the base formulation.

In accordance with the invention, any thermal free-radical initiators can be used in the invention. Suitable thermal free-radical initiators are known to a skilled artisan and include, for example, peroxides, hydroperoxides, azo-bis (alkyl- or cycloalkylnitriles), persulfates, percarbonates, or mixtures thereof. Examples of preferred thermal free-radical initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxy-phthalate, t-butyl hydroperoxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl)peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-C50), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis[2-(2-imidazolin-2-yl)propane]dihydrochloride (VAZO 44), 2,2'-azobis (2-amidinopropane) dihydrochloride (VAZO 50), 2,2'-azobis(2,4-dimethylvaleronitrile) (VAZO 52), 2,2'-azobis (isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis(2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

In accordance with the invention, any photoinitiators can be used in the invention. Suitable photoinitiators are benzoin methyl ether, diethoxyacetophenone, a benzoyl-phosphine oxide, 1-hydroxycyclohexyl phenyl ketone and Darocur and Irgacur types, preferably Darocur 1173® and Darocur 2959®, Germanium-based Norrish Type I photoinitiators (e.g., those described in U.S. Pat. No. 7,605,190). Examples of benzoylphosphine initiators include 2,4,6-trimethylbenzoyldiphenylophosphine oxide; bis-(2,6-dichlorobenzoyl)-4-N-propylphenyl-phosphine oxide; and bis-(2,6-dichlorobenzoyl)-4-N-butylphenylphosphine oxide. Reactive photoinitiators which can be incorporated, e.g., into a macromer or can be used as a special monomer are also suitable. Examples of reactive photoinitiators are those disclosed in EP632329.

A polymerizable composition of the invention can further comprise antimicrobial agents (e.g., silver nanoparticles), a bioactive agent (e.g., a drug, an amino acid, a polypeptide, a protein, a nucleic acid, 2-pyrrolidone-5-carboxylic acid (PCA), an alpha hydroxyl acid, linoleic and gamma linoleic acids, vitamins, or any combination thereof), leachable lubricants (e.g., a non-crosslinkable hydrophilic polymer having an average molecular weight from 5,000 to 500,000, preferably from 10,000 to 300,000, more preferably from 20,000 to 100,000 Daltons), leachable tear-stabilizing agents (e.g., a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof), or combinations thereof, as known to a person skilled in the art.

In accordance with the invention, a polymerizable composition of the invention is a fluid composition, which can be a solution, a solventless blend (i.e., a fluid composition free of any non-reactive diluent—organic solvent).

Where a polymerizable composition of the invention is a solution. It can be prepared by dissolving all of the desirable components in any suitable solvent known to a person skilled in the art. Example of suitable solvents includes without limitation, water, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof. Preferably, a polymerizable composition is a solution of all the desirable components in water, 1,2-propylene glycol, a polyethyleneglycol having a molecular weight of about 400 Daltons or less, or a mixture thereof.

Where a polymerizable composition of the invention is a solventless blend, it can be prepared by mixing all polymerizable components and other necessary component. A solventless polymerizable composition typically comprises at least one blending vinylic monomer as a reactive solvent for dissolving all other polymerizable components of the solventless polymerizable composition. Examples of preferred blending vinylic monomers are described later in this application. Preferably, methyl methacrylate is used as a blending vinylic monomer in preparing a solventless polymerizable composition.

A contact lens of the invention has an oxygen permeability of preferably at least about 40 barrers, more preferably at least about 60 barrers, even more preferably at least about 80 barrers (at about 35° C.).

A contact lens of the invention has an elastic modulus of about 1.5 MPa or less, preferably about 1.2 MPa or less, more preferably from about 0.3 MPa to about 1.0 MPa (at a temperature of from about 22° C. to 28° C.).

A contact lens of the invention further has an equilibrium water content of from about 15% to about 75%, more preferably from about 20% to about 70% by weight, even more preferably from about 25% to about 65% by weight (at room temperature) when fully hydrated. The equilibrium water content of a photochromic SiHy contact lens can be measured according to the procedure disclosed in Example 1.

All of the various embodiments of the molds, polymerizable composition, curing, and contact lens of the invention described above can be used in this aspect of the invention.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A UV/HEVL-filtering contact lens, comprising a bulk hydrogel material that comprises:
   (1) repeating units of at least one hydrophilic vinylic monomer;
   (2) repeating units of at least one vinylic crosslinker;
   (3) repeating units of at least one UV-absorbing vinylic monomer that absorbs UV lights between 280 nm and 380 nm;
   (4) at least one UV/HEVL-absorbing vinylic monomer that absorbs UV lights between 280 nm and 380 nm and HEVL between 380 nm and 450 nm; and
   (5) derivatives of at least one Cu(II)-porphyrin, wherein the derivatives are covalently attached to the bulk hydrogel material and have an absorption peak in a region from 395 nm to 435 nm (i.e., a Soret peak or band) in visible absorption spectrum, wherein said components (3), (4) and (5) are present in the bulk hydrogel material in amounts and at a ratio for rendering the UV/HEVL-filtering contact lens to have a UVA % T of less than less 10%, UVB % T of less than 1%, a HEVL % T of about 60% or less, a % T at 420 nm of about 40% or less, and a % T of about 80% or greater at any wavelength between 450 nm and 500 nm.
2. The UV/HEVL-filtering contact lens of embodiment 1, wherein the UV/HEVL-filtering contact lens has a HEVL % T of about 55% or less.
3. The UV/HEVL-filtering contact lens of embodiment 1, wherein the UV/HEVL-filtering contact lens has a HEVL % T of about 50% or less.
4. The UV/HEVL-filtering contact lens of embodiment 1, wherein the UV/HEVL-filtering contact lens has a HEVL % T of about 45 or less.
5. The UV/HEVL-filtering contact lens of any one of embodiments 1 to 4, wherein the UV/HEVL-filtering contact lens has a % T at 420 nm of about 30% or less.
6. The UV/HEVL-filtering contact lens of any one of embodiments 1 to 4, wherein the UV/HEVL-filtering contact lens has a % T at 420 nm of about 25% or less.
7. The UV/HEVL-filtering contact lens of any one of embodiments 1 to 4, wherein the UV/HEVL-filtering contact lens has a % T at 420 nm of about 20% or less.
8. The UV/HEVL-filtering contact lens of any one of embodiments 1 to 7, wherein the UV/HEVL-filtering contact lens has a % T of about 85% or greater.
9. The UV/HEVL-filtering contact lens of any one of embodiments 1 to 7, wherein the UV/HEVL-filtering contact lens has a % T of about 90% or greater at any wavelength between 450 nm and 500 nm.
10. The UV/HEVL-filtering contact lens of any one of embodiments 1 to 9, wherein said at least one UV-absorbing vinylic monomer comprises a benzotriazole-containing vinylic monomer and/or a benzophenone-containing vinylic monomer.
11. The UV/HEVL-filtering contact lens of embodiment 10, wherein the benzophenone-containing vinylic monomer is 2-hydroxy-4-acryloxy benzophenone, 2-hydroxy-4-methacryloxy benzophenone, 2-hydroxy-4-acryloxyethoxy benzophenone, 2-hydroxy-4-methacryloxyethoxy benzophenone, 4-allyloxy-2-hydroxybenzophenone, 4-allyloxyethoxy-2-hydroxybenzophenone, N-(2-benzoyl-4-chlorophenyl)methacrylamide, 2-hydroxy-4-methoxy-4'-(acrylamido-N,N-dimethypropylaminomethyl)-benzophenone, or combinations thereof.

12. The UV/HEVL-filtering contact lens of any one of embodiments 1 to 11, wherein said at least one UV-absorbing vinylic monomer comprises a benzotriazole-containing vinylic monomer.

13. The UV/HEVL-filtering contact lens of any one of embodiments 1 to 11, wherein said at least one UV-absorbing vinylic monomer comprises a benzotriazole-containing vinylic monomer of formula (1)

(1)

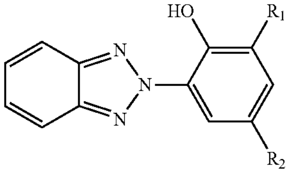

in which:

one of $R_1$ and $R_2$ is H while the other of $R_1$ and $R_2$ is a monovalent radical of $-L_1-E_1$; $E_1$ is vinyl, vinyloxy, allyl, allyloxy, (meth)acryloxy, or (meth)acrylamido; $L_1$ is a direct bond, a $C_1$-$C_6$ alkylene divalent radical, or a linkage of $-L_2-X_1-L_3-$; $L_2$ is a direct bond, a $C_1$-$C_3$ alkylene divalent radical,

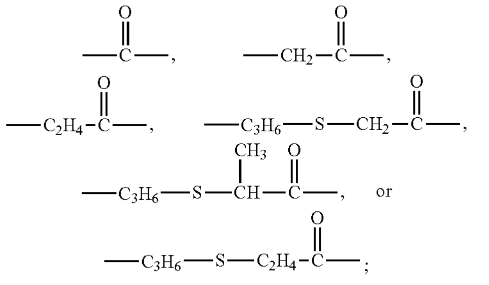

or $X_1$ is O, NH, or

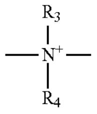

in which $R_3$ and $R_4$ are methyl or ethyl; $L_3$ is a $C_1$-$C_6$ alkylene divalent radical.

14. The UV/HEVL-filtering contact lens of any one of embodiments 1 to 11, wherein said at least one UV-absorbing vinylic monomer comprises 2-(2'-hydroxy-5'-vinylphenyl)-2H-benzotriazole, 2-(2'-hydroxy-5'-methacryloxyphenyl)-2H-benzotriazole, 2-(2'-hydroxy-5'-acryloyloxyphenyl)-2H-benzotriazole, 2-[2'-hydroxy-5'-(2-methacryloxyethyl)phenyl)]-2H-benzotriazole (Norbloc), 2-[2'-hydroxy-5'-(2-acryloxyethyl)-phenyl)]-2H-benzotriazole, 2-(2'-hydroxy-5'-methacryloxypropylphenyl)-2H-benzotriazole, 2-(2'-hydroxy-5'-acryloxypropylphenyl)-2H-benzotriazole, or a combination thereof.

15. The UV/HEVL-filtering contact lens of any one of embodiments 1 to 14, wherein said at least one UV/HEVL-absorbing vinylic monomer comprises a benzotriazole-containing vinylic monomer.

16. The UV/HEVL-filtering contact lens of any one of embodiments 1 to 14, wherein said at least one UV/HEVL-absorbing vinylic monomer comprises a benzotriazole-containing vinylic monomer of formula (2)

(2)

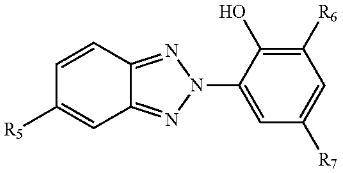

in which:

$R_5$ is H, F, Cl, $CF_3$, $CCl_3$, $CH_3$, or $OCH_3$; one of $R_6$ and $R_7$ is H, $OCH_3$, F, Cl, $CF_3$, $CCl_3$, or a $C_1$-$C_{10}$ alkyl while the other of $R_6$ and $R_7$ is a monovalent radical of $-L_1-E_1$; $E_1$ is vinyl, vinyloxy, allyl, allyloxy, (meth)acryloxy, or (meth)acrylamido; $L_1$ is a direct bond, a $C_1$-$C_6$ alkylene divalent radical, or a linkage of $-L_2-X_1-L_3-$; $L_2$ is a direct bond, a $C_1$-$C_3$ alkylene divalent radical

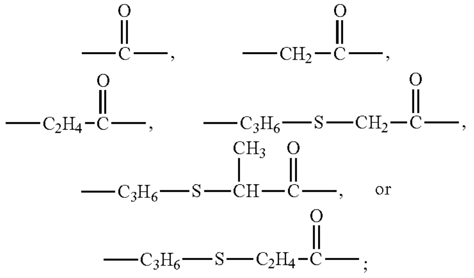

or $X_1$ is O, NH, or

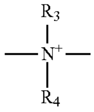

in which $R_3$ and $R_4$ are methyl or ethyl; $L_3$ is a $C_1$-$C_6$ alkylene divalent radical, provided that at least two of $R_5$, $R_6$ and $R_7$ are not H.

17. The UV/HEVL-filtering contact lens of any one of embodiments 1 to 14, wherein said at least one UV/HEVL-absorbing vinylic monomer comprises 2-(2'-hydroxy-3'-methacrylamidomethyl-5'-tert-octylphenyl)-2H-benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 4-allyl-2-(5-chloro-2H-benzo[d][1,2,3]triazol-2-yl)-6-methoxyphenol, 2-{2'-Hydroxy-3'-tert-butyl-5'-[3"-(4"-vinylbenzyloxy)propoxy]phenyl}-5-methoxy-2H-benzotriazole, 2-(5-chloro-2H-benzotriazol-2-yl)-6-(1,1-dimethylethyl)-4-ethenyl-phenol, 2-[2'-hydroxy-3'-tert-butyl-5'-(3'-methacryloyloxypropoxy)phenyl]-2H- benzotriazole, 2-{2'-Hydroxy-3'-tert-butyl-5'-[3'-methacryloyloxypropoxy]phenyl}-5-methoxy-2H-benzotriazole, 2-{2'-Hydroxy-3'-tert-butyl-5'-[3'-methacryloyloxypropoxy]phenyl}-5-chloro-2H-benzotriazole, 2-[2'-Hydroxy-3'-tert-butyl-5'-(3'-acryloyloxypropoxy)phenyl]-5-trifluoromethyl-2H-benzotriazole, 2-(2'-hydroxy-5-methacrylamidophenyl)-5-methoxybenzotriazole, 2-(3-allyl-2-hydroxy-5-methylphenyl)-2H-benzotriazole, 2-(2-Hydroxy-3-methallyl-5-methylphenyl)-2H-benzotriazole, 2-[3'-t-butyl-2'-hydroxy-5'-(3"-dimethylvinylsilylpropoxy)-2'-hydroxy-phenyl)]-5-methoxybenzotriazole, 2-(2'-hydroxy-5'-methacryloylpropyl-3'-tert-butyl-phenyl)-5-methoxy-2H-benzotriazole, 2-(2'-hydroxy-5'-acryloylpropyl-3'-tert-butyl-phenyl)-5-methoxy-2H-benzotriazole, 2-Methylacrylic acid 3-[3-tert-butyl-5-(5-chlorobenzotriazol-2-yl)-4-hydroxyphenyl]-propyl ester, 2-(3-(tert-butyl)-4-hydroxy-5-(5-methoxy-2H-benzo[d][1,2,3]triazol-2-yl)phenoxy)ethyl methacrylate; 2-(5-chloro-2H-benzotriazol-2-yl)-6-methoxy-4-(2-propen-1-yl)-phenol; 2-[2-Hydroxy-5-[3-(methacryloyloxy)propyl]-3-tert-butylphenyl]-5-chloro-2H-benzotriazole, or combinations thereof.

18. The UV/HEVL-filtering contact lens of any one of embodiments 1 to 17, wherein said at least one Cu(II)-porphyrin comprises a Cu(II)-meso-aryl-substituted porphyrin.

19. The UV/HEVL-filtering contact lens of any one of embodiments 1 to 17, wherein said at least one Cu(II)-porphyrin comprises a Cu(II)-meso-aryl-substituted porphyrin of formula (3) or (4)

(4)

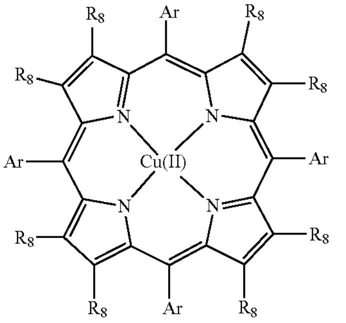

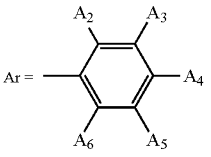

(4)

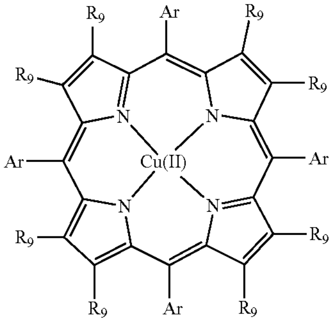

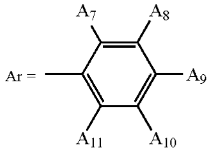

in which:

each of $R_8$ and $R_9$ is independently H, Cl, F, substituted or unsubstituted $C_1$-$C_{20}$ alkyl, substituted or unsubstituted $C_1$-$C_{20}$ alkenyl, substituted or unsubstituted $C_1$-$C_{20}$ alkynyl, or two adjacent $R_3$ groups, together with the atoms to which they are attached, form a substituted or unsubstituted $C_6$-$C_{14}$ aryl, substituted or unsubstituted $C_3$-$C_{14}$ carbocyclyl, substituted or unsubstituted $C_5$-$C_{14}$ heteroaryl, or substituted or unsubstituted $C_3$-$C_{14}$ heterocyclyl;

$A_2$, $A_3$, $A_4$, $A_5$, and $A_6$ independent of each other are H, Cl, F, $CCl_3$, $CF_3$, $CH_3$, $CH(CH_3)_2$, $C(CH_3)_3$, $OCH_3$, OH, $NO_2$, or a monovalent radical of -$L_1$-$E_1$;

$A_7$ and $A_{11}$ independent of each other are Cl, F, $CCl_3$, $CF_3$, $CH_3$, $CH(CH_3)_2$, $C(CH_3)_3$, $OCH_3$, OH, or $NO_2$ (preferably Cl, F, or $NO_2$);

$A_8$, $A_9$ and $A_{10}$ independent of one another are H, Cl, F, $CCl_3$, $CF_3$, $CH_3$, $CH(CH_3)_2$, $C(CH_3)_3$, $OCH_3$, OH, $NH_2$, or $NO_2$;

$E_1$ is vinyl, vinyloxy, allyl, allyloxy, (meth)acryloxy, or (meth)acrylamido;

$L_1$ is a direct bond, a $C_1$-$C_6$ alkylene divalent radical, or a linkage of -$L_2$-$X_1$-$L_3$-;

$L_2$ is a direct bond, a $C_1$-$C_3$ alkylene divalent radical,

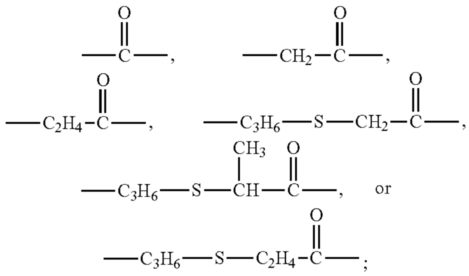

$X_1$ is O, NH, or

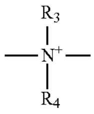

in which $R_3$ and $R_4$ are methyl or ethyl;

$L_3$ is a $C_1$-$C_6$ alkylene divalent radical, provided that one of $A_2$, $A_3$, $A_4$, $A_5$, and $A_6$ is a monovalent radical of $-L_1-E_1$.

20. The UV/HEVL-filtering contact lens of any one of embodiments 1 to 19, wherein the bulk hydrogel material in dried state comprises from about 0.6% to about 3.5% by weight of all components (3), (4) and (5).

21. The UV/HEVL-filtering contact lens of any one of embodiments 1 to 19, wherein the bulk hydrogel material in dried state comprises from about 0.7% to about 3.0% by weight of all components (3), (4) and (5).

22. The UV/HEVL-filtering contact lens of any one of embodiments 1 to 19, wherein the bulk hydrogel material in dried state comprises from about 0.8% to about 2.5% by weight of all components (3), (4) and (5).

23. The UV/HEVL-filtering contact lens of any one of embodiments 1 to 22, wherein said at least one hydrophilic vinylic monomer comprises: (1) an alkyl (meth) acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris (hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof; (3) a carboxyl-containing acrylic monomer selected from the group consisting of 2-(meth)acrylamidoglycolic acid, (meth) acrylic acid, ethylacrylic acid, 3-(meth) acrylamidopropionic acid, 5-(meth) acrylamidopentanoic acid, 4-(meth) acrylamidobutanoic acid, 3-(meth)acrylamido-2-methylbutanoic acid, 3-(meth)acrylamido-3-methylbutanoic acid, 2-(meth)acrylamido-2methyl-3, 3-dimethyl butanoic acid, 3-(meth)acrylamidohaxanoic acid, 4-(meth)acrylamido-3,3-dimethylhexanoic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth) acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof; (5) an N-vinyl amide monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (7) an acrylic monomer having a $C_1$-$C_4$ alkoxyethoxy group and selected from the group consisting of ethylene glycol methyl ether (meth)acrylate, di(ethylene glycol) methyl ether (meth)acrylate, tri (ethylene glycol) methyl ether (meth)acrylate, tetra (ethylene glycol) methyl ether (meth)acrylate, $C_1$-$C_4$-alkoxy poly(ethylene glycol) (meth)acrylate having a number average molecular weight of up to 1500, methoxy-poly(ethylene glycol)ethyl (meth)acrylamide having a number average molecular weight of up to 1500, and combinations thereof; (8) a vinyl ether monomer selected from the group consisting of ethylene glycol monovinyl ether, di(ethylene glycol) monovinyl ether, tri(ethylene glycol) monovinyl ether, tetra (ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra (ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof; (10) a phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2-(trimethylammonio)ethylphosphate, 2-[(meth)acryloylamino]ethyl-2'-(trimethylammonio)-ethylphosphate, 3-[(meth) acryloylamino]propyl-2'-(trimethylammonio)ethylphosphate, 4-[(meth)acryloylamino]butyl-2'-(trimethylammonio)ethylphosphate, 5-((meth)acryloyloxy)pentyl-2-(trimethylammonio)ethyl phosphate, 6-((meth) acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy) pentyl-2'-(trimethylammonio)ethylphosphate, 2-((meth)acryloyloxy)hexyl-2'-(trimethylammonio) ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino) ethyl-2'-(trimethylammonio)ethyl phosphate, 2-(butenoyloxy)ethyl-2'-(trimethylammonio)ethylphosphate, and combinations thereof; (11) allyl alcohol; (12)N-2-hydroxyethyl vinyl carbamate; (13)N-carboxyvinyl-p-alanine (VINAL); (14)N-carboxyvinyl-a-alanine; (15) or combinations thereof.

24. The UV/HEVL-filtering contact lens of any one of embodiments 1 to 23, wherein the bulk hydrogel material is a non-silicone hydrogel material.

25. The UV/HEVL-filtering contact lens of embodiment 24, wherein the non-silicone hydrogel material comprises at least 50% by mole of repeating units of at least one hydroxyl-containing vinylic monomer.

26. The UV/HEVL-filtering contact lens of embodiment 25, wherein said at least one hydroxyl-containing vinylic monomer is selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, vinyl alcohol, allyl alcohol, and combinations thereof.

27. The UV/HEVL-filtering contact lens of any one of embodiments 1 to 23, wherein the bulk hydrogel material is a silicone hydrogel material.

28. The UV/HEVL-filtering contact lens of embodiment 27, wherein the silicone hydrogel material comprises repeating units of at least one siloxane-containing vinylic monomer.

29. The UV/HEVL-filtering contact lens of embodiment 28, wherein said at least one siloxane-containing vinylic monomer is selected from the group consisting of α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxane, α-[3-(meth)acryloxy-propyloxy-2-hydroxypropyloxypropyl]-terminated ω-$C_1$-$C_4$-alkyl terminated polydimethylsiloxane, α-[3-(meth)acryloxyisopropyloxy-2-hydroxypropyloxypropyl]-terminated ω-$C_1$-$C_4$-alkyl terminated polydimethylsiloxane, α-[3-(meth)acryloxybutyloxy-2-hydroxypropyloxypropyl]-terminated ω-$C_1$-$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth)acryloxypropylamino-2-hydroxypropyloxypropyl]-terminated ω-$C_1$-$C_4$-alkyl terminated polydimethylsiloxane, α-[3-(meth)acryloxy-butylamino-2-hydroxypropyloxypropyl]-terminated ω-$C_1$-$C_4$-alkyl terminated polydimethylsiloxane, α-[(meth) acryloxy(polyethylenoxy)-2-hydroxypropyloxypropyl]-terminated ω-$C_1$-$C_4$-alkyl terminated polydimethylsiloxane, α-[(meth)acryloxy-2-hydroxypropyloxy-ethoxypropyl]-terminated ω-$C_1$-$C_4$-alkyl terminated polydimethylsiloxane, α-[(meth)acryloxy-2-hydroxypropyl-N-ethylaminopropyl]-terminated ω-$C_1$-$C_4$-alkyl terminated polydimethylsiloxane, α-[(meth)acryloxy-2-hydroxypropyl-aminopropyl]-terminated ω-$C_1$-$C_4$-alkyl terminated polydimethylsiloxane, α-[(meth)acryloxy-2-hydroxypropyloxy-(polyethylenoxy)propyl]-terminated ω-$C_1$-$C_4$-alkyl terminated polydimethylsiloxane, α-(meth)acryloylamidopropyloxypropyl terminated ω-$C_1$-$C_4$-alkyl terminated polydimethylsiloxane, α-N-methyl-(meth) acryloylamidopropyloxypropyl terminated ω-$C_1$-$C_4$-alkyl terminated polydimethylsiloxane, α-[3-(meth) acrylamidoethoxy-2-hydroxypropyloxy-propyl]-terminated ω-$C_1$-$C_4$-alkyl polydimethylsiloxane, α-[3-(meth)acrylamidopropyloxy-2-hydroxypropyloxypropyl]-terminated ω-$C_1$-$C_4$-alkyl terminated polydimethylsiloxane, α-[3-(meth)acrylamidoisopropyloxy-2-hydroxypropyloxypropyl]-terminated ω-$C_1$-$C_4$-alkyl terminated polydimethylsiloxane, α-[3-(meth) acrylamidobutyloxy-2-hydroxypropyloxypropyl]-terminated ω-$C_1$-$C_4$-alkyl terminated polydimethylsiloxane, α-[3-(meth)acryloylamido-2-hydroxypropyloxypropyl] terminated ω-$C_1$-$C_4$-alkyl polydimethylsiloxane, α-[3-[N-methyl-(meth)acryloylamido]-2-hydroxypropyloxypropyl] terminated ω-$C_1$-$C_4$-alkyl terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethylbutylsilane) (meth)acrylamide, (meth)acryloylamidopropyltetra(dimethylsiloxy)dimethylbutylsilane, α-vinyl carbonate-terminated ω-$C_1$-$C_4$-alkyl-terminated polydimethylsiloxanes, α-vinyl carbamate-terminated ω-$C_1$-$C_4$-alkyl-terminated polydimethylsiloxane, and a mixture thereof.

30. The UV/HEVL-filtering contact lens of embodiment 28, wherein said at least one siloxane-containing vinylic monomer is selected from the group consisting of a vinylic monomer having a bis(trialkylsilyloxy) alkylsilyl group, a vinylic monomer having a tris(trialkylsilyloxy)silyl group, a polysiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

31. The UV/HEVL-filtering contact lens of embodiment 28, wherein said at least one siloxane-containing vinylic monomer comprises at least one vinylic monomer of formula (M1) or (M2)

(M1)

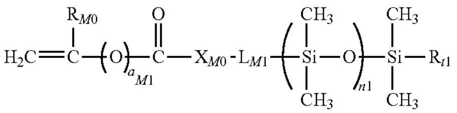

-continued (M2)

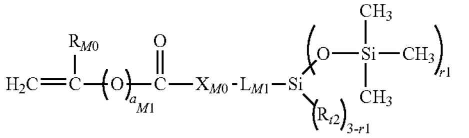

in which: $a_{M1}$ is zero or 1; $R_{M0}$ is H or methyl; $X_{M0}$ is O or $NR_{M1}$; $L_{M1}$ is a $C_2$-$C_8$ alkylene divalent radical or a divalent radical of $-L_{M1}'$-XM-$L_{M1}''$-,

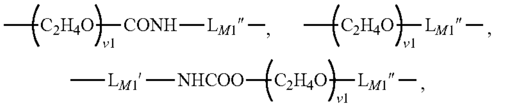

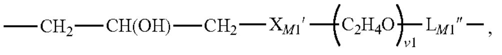

$L_{M1}'$-$X_{M1}'$-$CH_2$—$CH(OH)CH_2O$-$L_{M1}''$-, or

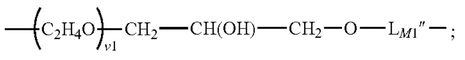

$L_{M1}'$ is a $C_2$-$C_8$ alkylene divalent radical which has zero or one hydroxyl group; $L_{M1}''$ is $C_3$-$C_8$ alkylene divalent radical which has zero or one hydroxyl group; $X_{M1}$ is O, $NR_{M1}$, NHCOO, OCONH, $CONR_{M1}$, or $NR_{M1}CO$; $R_{M1}$ is H or a $C_1$-$C_4$ alkyl having 0 to 2 hydroxyl group; $R_{t1}$ and $R_{t2}$ independent of each other are a $C_1$-$C_6$ alkyl; $X_{M1}'$ is O or $NR_{M1}$; v1 is an integer of 1 to 30; m2 is an integer of 0 to 30; n1 is an integer of 3 to 40; and r1 is an integer of 2 or 3.

32. The UV/HEVL-filtering contact lens of embodiment 28, wherein said at least one siloxane-containing vinylic monomer comprises tris(trimethylsilyloxy)silylpropyl (meth)acrylate, [3-(meth)acryloxy-2-hydroxypropyloxy]propylbis(trimethylsiloxy)methylsilane, [3-(meth)acryloxy-2-hydroxypropyloxy] propylbis(trimethylsiloxy)butylsilane, 3-(meth) acryloxy-2-(2-hydroxyethoxy)-propyloxy)propylbis (trimethylsiloxy)methylsilane, 3-(meth)acryloxy-2-hydroxypropyloxy)propyltris(trimethylsiloxy)silane, N-[tris(trimethylsiloxy)silylpropyl]-(meth)acrylamide, N-(2-hydroxy-3-(3-(bis(trimethylsilyloxy)methylsilyl) propyloxy)propyl)-2-methyl (meth)acrylamide, N-(2-hydroxy-3-(3-(bis(trimethylsilyloxy)methylsilyl)propyloxy)-propyl) (meth)acrylamide, N-(2-hydroxy-3-(3-(tris(trimethylsilyloxy)silyl)propyloxy)propyl)-2-methyl acrylamide, N-(2-hydroxy-3-(3-(tris (trimethylsilyloxy)silyl)propyloxy)propyl) (meth) acrylamide, N-[tris(dimethylpropylsiloxy)silylpropyl]-(meth)acrylamide, N-[tris(dimethylphenylsiloxy)-silylpropyl] (meth)acrylamide, N-[tris (dimethylethylsiloxy)-silylpropyl] (meth)acrylamide, N,N-bis[2-hydroxy-3-(3-(bis(trimethylsilyloxy)methylsilyl)-propyloxy)propyl]-2-methyl (meth)acrylamide, N,N-bis[2-hydroxy-3-(3-(bis(trimethylsilyloxy) methylsilyl)propyloxy)-propyl] (meth)acrylamide, N,N-bis[2-hydroxy-3-(3-(tris(trimethylsilyloxy)silyl) propyloxy)-propyl]-2-methyl (meth)acrylamide, N,N-bis[2-hydroxy-3-(3-(tris(trimethylsilyloxy)silyl)-propyloxy)propyl] (meth)acrylamide, N-[2-hydroxy-3-(3-(t-butyldimethylsilyl)propyloxy)-propyl]-2-methyl (meth)acrylamide, N-[2-hydroxy-3-(3-(t-butyldimethylsilyl)propyloxy)-propyl] (meth)acrylamide, N,N-bis [2-hydroxy-3-(3-(t-butyldimethylsilyl)propyloxy)propyl]-2-methyl (meth)acrylamide, N-2-(meth) acryloxyethyl-O-(methyl-bis-trimethylsiloxy-3-propyl)silyl carbamate, 3-(trimethylsilyl)propylvinyl carbonate, 3-(vinyloxycarbonylthio)-propyl-tris(trimethyl-siloxy)silane, 3-[tris(trimethylsiloxy)silyl]propylvinyl carbamate, 3-[tris(trimethylsiloxy)silyl] propyl allyl carbamate, 3-[tris(trimethylsiloxy)silyl]propyl vinyl carbonate, or a combination thereof.

33. The UV/HEVL-filtering contact lens of any one of embodiments 27 to 32, wherein said at least one vinylic crosslinker comprises at least one polysiloxane vinylic crosslinker.

34. The UV/HEVL-filtering contact lens of embodiment 33, wherein said at least one polysiloxane vinylic crosslinker comprises a di-(meth)acryloyloxy-terminated polysiloxane vinylic crosslinker having dimethylsiloxane units and hydrophilized siloxane units each having one methyl substituent and one monovalent $C_4$-$C_{40}$ organic radical substituent having 2 to 6 hydroxyl groups.

35. The UV/HEVL-filtering contact lens of embodiment 33, wherein said at least one polysiloxane vinylic crosslinker comprises at least one hydrophilized polysiloxane vinylic crosslinker of formula (G)

(G)

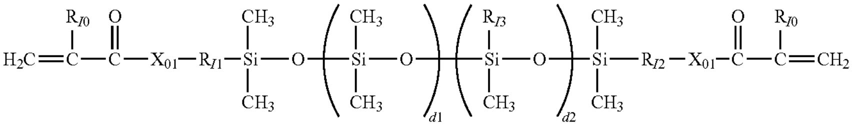

in which:

d1 is an integer of from 30 to 500 and d2 is an integer of from 1 to 75, provided that d2/d1 is from about 0.035 to about 0.15;

$X_{01}$ is O or $NR_{IN}$ in which $R_{IN}$ is hydrogen or $C_1$-$C_{10}$-alkyl;

$R_{I0}$ is hydrogen or methyl;

$R_{I1}$ and $R_{I2}$ independently of each other are a substituted or unsubstituted $C_1$-$C_{10}$ alkylene divalent radical or a divalent radical of —$R_{I4}$—O—$R_{I5}$— in which $R_{I4}$ and $R_{I5}$ independently of each other are a substituted or unsubstituted $C_1$-$C_{10}$ alkylene divalent radical;

$R_{I3}$ is a monovalent radical of any one of formula (G-1) to (G-5)

(G-1)

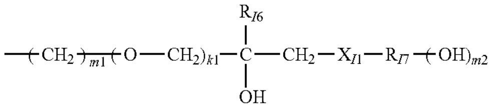

(G-2)

$$-(CH_2)_{m3}-X_{l2}-R_{l8}-(OH)_{m4}$$

(G-3)

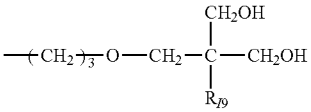

(G-4)

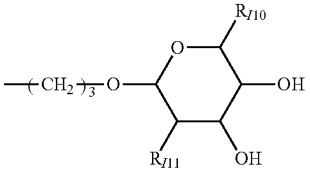

(G-5)

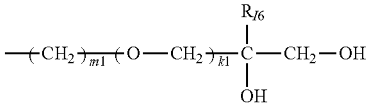

k1 is zero or 1; m1 is an integer of 2 to 4; m2 is an integer of 1 to 5; m3 is an integer of 3 to 6; m4 is an integer of 2 to 5;

$R_{l6}$ is hydrogen or methyl;

$R_{l7}$ is a $C_2$-$C_6$ hydrocarbon radical having (m2+1) valencies;

$R_{l8}$ is a $C_2$-$C_6$ hydrocarbon radical having (m4+1) valencies;

$R_{l9}$ is ethyl or hydroxymethyl;

$R_{l10}$ is methyl or hydromethyl;

$R_{l11}$ is hydroxyl or methoxy;

$X_{l1}$ is a sulfur linkage of —S— or a teriary amino linkage of $—NR_{l12}—$ in which $R_{l12}$ is $C_1$-$C_1$ alkyl, hydroxyethyl, hydroxypropyl, or 2,3-dihydroxypropyl; and $X_{l2}$ is an amide linkage of

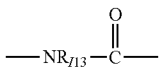

or

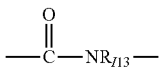

in which $R_{l13}$ is hydrogen or $C_1$-$C_{10}$ alkyl.

36. The UV/HEVL-filtering contact lens of embodiment 33, wherein said at least one polysiloxane vinylic crosslinker comprises: (i) a vinylic crosslinker which comprises one sole polydiorganosiloxane segment and two terminal ethylenically-unsaturated groups selected from the group consisting of (meth)acryloyloxy groups, (meth)acryloylamino groups, vinyl carbonate groups, vinylcarbamate groups; and/or (ii) a chain-extended polysiloxane vinylic crosslinker which comprises at least two polydiorganosiloxane segment and a covalent linker between each pair of polydiorganosiloxane segments and two terminal ethylenically-unsaturated groups selected from the group consisting of (meth)acryloyloxy groups, (meth)acryloylamino groups, vinyl carbonate groups, vinylcarbamate groups.

37. The UV/HEVL-filtering contact lens of embodiment 33, wherein said at least one polysiloxane vinylic crosslinker comprises α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, or combinations thereof.

38. The UV/HEVL-filtering contact lens of any one of embodiments 27 to 37, wherein said at least one hydrophilic vinylic monomer comprises at least one hydrophilic N-vinyl amide monomer selected from the group consisting of N-vinylpyrrolidone, N-vinyl piperidone, N-vinyl caprolactam, N-vinyl-N-methyl acetamide, N-vinyl formamide, N-vinyl acetamide, N-vinyl isopropylamide, N-vinyl-N-methyl acetamide, N-vinyl-N-ethyl acetamide, N-vinyl-N-ethyl formamide, and mixtures thereof.

39. The UV/HEVL-filtering contact lens of any one of embodiments 27 to 37, wherein said at least one hydrophilic vinylic monomer comprises N-vinylpyrrolidone and/or N-vinyl-N-methyl acetamide.

40. The UV/HEVL-filtering contact lens of any one of embodiments 27 to 39, wherein said at least one hydrophilic vinylic monomer comprises a hydrophilic (meth)acrylamido monomer selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth) acrylamide, N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, poly(ethylene glycol)ethyl (meth)acrylamide having a number average molecular weight of up to 1500, 2-(meth)acrylamidoglycolic acid, 3-(meth)acrylamido-propionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(meth)acrylamido-2methyl-3,3-dimethyl butanoic acid, 3-(meth)acrylamidohaxanoic acid, 4-(meth)acrylamido-3,3-dimethylhexanoic acid, N-2-aminoethyl (meth)acrylamide, N-2-methylaminoethyl (meth)acrylamide, N-2-ethylaminoethyl (meth) acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, methoxy-poly(ethylene glycol)ethyl (meth)acrylamide having a number average molecular weight of up to 1500, and combinations thereof.

41. The UV/HEVL-filtering contact lens of any one of embodiments 27 to 39, wherein said at least one hydrophilic vinylic monomer comprises a hydrophilic (meth)acrylamido monomer selected from the group consisting of (meth)acrylamide, N,N-dimethyl (meth) acrylamide, N-ethyl (meth)acrylamide, N-propyl (meth)acrylamide, N-isopropyl (meth)acrylamide, N-3-methoxypropyl (meth)acrylamide, N-2-hydroxylethyl (meth)acrylamide, N-3-hydroxypropyl (meth) acrylamide, and combinations thereof.

42. The UV/HEVL-filtering contact lens of any one of embodiments 27 to 41, wherein said at least one hydrophilic vinylic monomer comprises a hydroxy-containing vinylic monomer selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, vinyl alcohol, allyl alcohol, and combinations thereof.

43. The UV/HEVL-filtering contact lens of any one of embodiments 27 to 42, wherein said at least one hydrophilic vinylic monomer comprises a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof.

44. The UV/HEVL-filtering contact lens of any one of embodiments 27 to 43, wherein the UV/HEVL-filtering contact lens has an oxygen permeability of at least 40 barrers (at about 35° C.) when being fully hydrated.

45. The UV/HEVL-filtering contact lens of any one of embodiments 27 to 43, wherein the UV/HEVL-filtering contact lens has an oxygen permeability of at least 60 barrers (at about 35° C.) when being fully hydrated.

46. The UV/HEVL-filtering contact lens of any one of embodiments 27 to 43, wherein the UV/HEVL-filtering contact lens has an oxygen permeability of at least 80 barrers (at about 35° C.) when being fully hydrated.

47. The UV/HEVL-filtering contact lens of any one of embodiments 1 to 46, wherein said at least one vinylic crosslinker comprises at least one non-silicone vinylic crosslinker.

48. The UV/HEVL-filtering contact lens of embodiment 47, wherein said at least one non-silicone vinylic crosslinker comprises ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide, dimethacrylamide, N,N-di (meth)acryloyl-N-methylamine, N,N-di(meth)acryloyl-N-ethylamine, N,N'-methylene bis(meth) acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth) acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, or combinations thereof.

49. The UV/HEVL-filtering contact lens of any one of embodiments 1 to 48, wherein the bulk hydrogel material further comprises repeating units of at least one hydrophobic non-silicone vinylic monomer.

50. The UV/HEVL-filtering contact lens of embodiment 46, wherein said at least one hydrophobic vinylic monomer comprises $C_1$-$C_{10}$ alkyl (meth)acrylate, cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoro-isopropyl (meth) acrylate, hexafluorobutyl (meth)acrylate, or combinations thereof.

51. The UV/HEVL-filtering contact lens of any one of embodiments 1 to 50, wherein the bulk hydrogel material further comprises repeating units of a polymerizable dye.

52. The UV/HEVL-filtering contact lens of 51, wherein the polymerizable dye is 1,4-bis(4-(2-methacryloxyethyl)phenylamino)anthraquinone (Reactive Blue 246), 1,4-bis((2-hydroxyethyl)amino)-9,10-anthracenedione-bis(2-propenoic)ester (Reactive Blue 247), or a combination thereof.

53. The UV/HEVL-filtering contact lens of any one of embodiments 1 to 52, wherein weight ratio of component (3) over component (4) in the bulk hydrogel material in dried state is at least 1.2 and weight ratio of component (4) over component (5) is at least 1.5.

54. The UV/HEVL-filtering contact lens of embodiment 53, wherein weight ratio of component (3) over component (4) in the bulk hydrogel material in dried state is at least 1.6.
55. The UV/HEVL-filtering contact lens of embodiment 53, wherein weight ratio of component (3) over component (4) in the bulk hydrogel material in dried state is at least 2.0.
56. The UV/HEVL-filtering contact lens of embodiment 53, wherein weight ratio of component (3) over component (4) in the bulk hydrogel material in dried state is at least 2.4.
57. The UV/HEVL-filtering contact lens of any one of embodiments 53 to 56, wherein weight ratio of component (4) over component (5) is at least 2.0.
58. The UV/HEVL-filtering contact lens of any one of embodiments 53 to 56, wherein weight ratio of component (4) over component (5) is at least 2.5.
59. The UV/HEVL-filtering contact lens of any one of embodiments 53 to 56, wherein weight ratio of component (4) over component (5) is at least 3.0.
60. The UV/HEVL-filtering contact lens of any one of embodiments 1 to 59, wherein the UV/HEVL-filtering contact lens has an elastic modulus of about 2.0 MPa or less (at a temperature of from 22° C. to 28° C.) when being fully hydrated.
61. The UV/HEVL-filtering contact lens of any one of embodiments 1 to 59, wherein the UV/HEVL-filtering contact lens has an elastic modulus of about 1.5 MPa or less (at a temperature of from 22° C. to 28° C.) when being fully hydrated.
62. The UV/HEVL-filtering contact lens of any one of embodiments 1 to 59, wherein the UV/HEVL-filtering contact lens has an elastic modulus of about 1.2 or less (at a temperature of from 22° C. to 28° C.) when being fully hydrated.
63. The UV/HEVL-filtering contact lens of any one of embodiments 1 to 59, wherein the UV/HEVL-filtering contact lens has an elastic modulus of from about 0.4 MPa to about 1.0 MPa (at a temperature of from 22° C. to 28° C.) when being fully hydrated.
64. The UV/HEVL-filtering contact lens of any one of embodiments 1 to 63, wherein the UV/HEVL-filtering contact lens has a water content of from about 15% to about 70% (at a temperature of from 22° C. to 28° C.) when being fully hydrated.
65. The UV/HEVL-filtering contact lens of any one of embodiments 1 to 63, wherein the UV/HEVL-filtering contact lens has a water content of from about 20% to about 70% (at a temperature of from 22° C. to 28° C.) when being fully hydrated.
66. The UV/HEVL-filtering contact lens of any one of embodiments 1 to 63, wherein the UV/HEVL-filtering contact lens has a water content of from about 25% to about 70% (at a temperature of from 22° C. to 28° C.) when being fully hydrated.
67. The UV/HEVL-filtering contact lens of any one of embodiments 1 to 63, wherein the UV/HEVL-filtering contact lens has a water content of from about 30% to about 65% (at a temperature of from 22° C. to 28° C.) when being fully hydrated.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

Unless specified, the oxygen transmissibility (Dk/t), the intrinsic (or edge-corrected) oxygen permeability ($Dk_i$ or $Dk_c$) of a lens and a lens material are determined according to procedures described in ISO 18369-4.

Equilibrium Water Content

The equilibrium water content (EWC) of contact lenses are determined as follows.

Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Elastic Modulus

The elastic modulus of a contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS (phosphate buffered saline) with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Transmittance

Contact lenses are manually placed into a specially fabricated sample holder or the like which can maintain the shape of the lens as it would be when placing onto eye. This holder is then submerged into a 1 cm path-length quartz cell containing phosphate buffered saline (PBS, pH~7.0-7.4) as the reference. A UV/visible spectrophotometer, such as, Varian Cary 3E UV-Visible Spectrophotometer with a LabSphere DRA-CA-302 beam splitter or the like, can be used in this measurement. Percent transmission spectra are collected at a wavelength range of 250-800 nm with % T values collected at 0.5 nm intervals. This data is transposed onto an Excel spreadsheet and used to determine if the lenses conform to Class 1 UV absorbance.

Transmittance is calculated using the following equations:

$$\text{UVA } \%\ T = \text{Average } \% \text{ Transmission between 315 nm and 380 nm} \times 100$$

$$\text{UVB } \%\ T = \text{Average } \% \text{ Transmission between 280 nm and 315 nm} \times 100$$

$$\text{HEVL } \%\ T = \text{Average } \% \text{ Transmission between 380 nm and 450 nm} \times 100.$$

Chemicals

CE-PDMS represents a polysiloxane vinylic crosslinker (Mw=10.1 K determined by $H^1$ NMR spectroscopy) which has three polydimethylsiloxane (PDMS) segments linked via diurethane linkages between two PDMS segments and two urethane linkages each located between one terminal methacrylate group and one PDMS segment and is prepared according to method similar to what described in Example 2 of U.S. Pat. No. 9,315,669; TRIS-Am represents N-[tris (trimethylsiloxy)-silylpropyl]acrylamide; DMA represent N,N-dimethylacrylamide; L-PEG 2000 represents N-(carbonyl-methoxypolyethylene glycol-2000)-1,2-disteaoyl-sn-glycero-3-phosphoethanolamin, sodium salt; DMPC represents 1,2-dimyristoyl-sn-glycero-3-phosphocholine; H-TEMPO represents 4-hydroxy-2,2,6,6-tetramethylpiperidin-1-oxyl; Norbloc is 2-[2'-hydroxy-5'-(2-methacryloxyethyl)phenyl)]-2H-benzotriazole from Aldrich; PrOH represents n-propanol; UV28 represents 2-{2'-Hydroxy-3'-tert-butyl-5'-[3'-methacryloyloxypropoxy]phenyl}-5-chloro-2H-benzotriazole; Cu-TBP-MAm represents Cu(II)-tetra (dimethylaminopropyl-methacrylamidophenyl)porphine; Ge PI represent Bis(4-methoxybenzoyl)diethylgermanium; RB247 represents 1,4-bis((2-hydroxyethyl)amino)-9,10-anthracenedione-bis(2-propenoic)ester (Reactive Blue 247); MEK represents methylethyl ketone; PBS represents a phosphate-buffered saline which has a pH of 7.2±0.2 at 25° C. and contains about 0.044 wt. % $NaH_2PO_4 \cdot H_2O$, about 0.388 wt. % $Na_2HPO_4 \cdot 2H_2O$, and about 0.79 wt. % NaCl and 98.78% water; wt. % represents weight percent.

PAA-coating solution. A polyacrylic acid (PAA) coating solution is prepared by dissolving an amount of PAA (M.W.: 450 kDa, from Lubrizol) in a given volume of 1-propanol (1-PrOH) to have a concentration of about 0.44% by weight and the pH is adjusted with formic acid to about 2.0.

Preparation of In-Package-Coating solution (IPC saline). Poly(AAm-co-AA)(90/10) partial sodium salt (~90% solid content, poly(AAm-co-AA) 90/10, Mw 200,000) is purchased from Polysciences, Inc. and used as received. Polyamidoamine epichlorohydrin (PAE) (Kymene, an azetidinium content of 0.46 assayed with NMR) is purchased from Ashland as an aqueous solution and used as received. IPC saline is prepared by dissolving about 0.07% w/w of poly(AAm-co-AA)(90/10) and about 0.10% of PAE (an initial azetidinium millimolar equivalents of about 8.8 millimole) in phosphate-buffered saline (PBS) (about 0.044 w/w % $NaH_2PO_4 \cdot H_2O$, about 0.388 w/w/% $Na_2HPO_4 \cdot 2H_2O$, about 0.79 w/w % NaCl) and adjusting the pH to 7.2-7.6. Then the IPC is heat pre-treated for about 6 hours at about 60° C. (heat pretreatment). During this heat pretreatment, poly(AAm-co-AA) and PAE are partially crosslinked to each other (i.e., not consuming all azetidinium groups of PAE) to form a water-soluble and thermally-crosslinkable hydrophilic polymeric material containing azetidinium groups within the branched polymer network in the IPC saline. After the heat pre-treatment, the IPC is cooled to room temperature then filtered using a 0.22 micron PES membrane filter.

Example 2

Preparation of Lens Formulations with 0.2% of UV28

A lens formulation is prepared to have the following composition: 0.20 parts by weight of UV28; 23.12 parts by weight of DMA; 22.49 parts by weight of PrOH; 0.02 parts by weight of RB247; 31.67 parts by weight of CE-PDMS; 19.66 parts by weight of TRIS-Aam; 0.76 parts by weight of DMPC; 0.61 parts by weight of L-PEG2000; 0.04 parts by weight of H-TEMPO; 0.90 parts by weight of Norbloc; and 0.60 part by weight of GePI.

UV28, DMA and PrOH, RB247, CE-PDMS, Tris-Aam, DMPC, L-PEG2000, H-TEMPO, and Norbloc are added into the amber vial. Then under yellow light GePI is added to the vial and all components are mixed for 30 min in the water bath preheated to 40° C. After all the solid is dissolved, the formulation is filtered with a glass micro filter (5.0 μm Millex®-SV filter).

Lens Fabrication

Lenses are prepared by cast-molding from the lens-forming composition prepared above in a reusable mold (quartz female mold half and glass male mold half), similar to the mold shown in FIGS. 1-6 in U.S. Pat. Nos. 7,384,590 and 7,387,759 (FIGS. 1-6). Lens formulation in the molds is cured for 30 seconds with 452 nm LED light at an intensity of 55.4 $mW/cm^2$. After demolding and delensing, cast-molded contact lenses are then extracted and coated by dipping in the following series of baths: 3 methyl ethyl ketone (MEK) baths (about 22, 78, and 224 second respectively); DI water bath (56 seconds); PAA dip solution prepared in Example 1 (44 seconds); 50/50 n-propanol/water bath (56 seconds); 3 DI water baths (56 seconds each), then equilibrated into PBS solution.

The resultant silicone hydrogel contact lenses are packaged/sealed in polypropylene lens packaging shells (or blisters) (one lens per shell) containing 0.65 mL of IPC saline prepared in Example 1 and autoclaved for 45 minutes at 121° C.

UV-vis spectrum of lens containing 0.2% of UV28 (UV/HEVL blocker) is recorded and is presented in FIG. 1. UV-VIS spectra of lenses containing 0.3 and 0.4% of UV28 are generated based on fabricated lens containing 0.2% of UV28. For 0.3% UV28 lens, absorbance from 0.2% UV28 lens is multiplied by 1.5 and then converted to % T. Similarly, for 0.4% UV28 lens, absorbance from 0.2% UV28 lens is multiplied by 2 and then converted to % T. Both graphs are plotted and are presented in FIG. 1. All lens properties are presented in the table below.

| UV28 | % T at 420 nm | % T Average 380-450 nm |
|---|---|---|
| 0.2 ppm | 77% | 67% |
| 0.3 ppm[1] | 68% | 58% |
| 0.4 ppm[1] | 60% | 51% |

[1]UV-VIS spectrum is generated based on lens fabricated with 0.2% UV28

Example 3

Preparation of Lens Formulations with 300, 500, and 700 ppm of Cu-TBP-MAm

A lens formulation is prepared to have the following composition: 0.03 to 0.07 parts by weight of Cu-TBP-MAm; 23.12 parts by weight of DMA; 22.49 parts by weight of PrOH; 0.02 parts by weight of RB247; 31.67 parts by weight of CE-PDMS; 19.66 parts by weight of TRIS-Aam; 0.76 parts by weight of DMPC; 0.61 parts by weight of L-PEG2000; 0.04 parts by weight of H-TEMPO; 0.90 parts by weight of Norbloc; and 0.60 part by weight of GePI.

Cu-TBP-MAm, DMA and PrOH are charged to first amber vial with a stir bar to mix at 300 rpm for 30 minutes at room temperature. RB247, CE-PDMS, Tris-Aam, DMPC, L-PEG2000, H-TEMPO, and Norbloc are added into the second amber vial. Then under yellow light GePI is added to the second vial and all components are mixed at 300 rpm for 30 minutes at room temperature. When all the solids dissolved, the content of the first jar is transferred to the second jar using disposable glass pipette under yellow light. The mixture is allowed to stir for at least 30 min in the water bath preheated to 40° C. After all the solid is dissolved, the formulation is filtered with a glass micro filter (5.0 μm Millex®-SV filter).

Lens Fabrication

Lenses are prepared by cast-molding from the lens-forming composition prepared above in a reusable mold (quartz female mold half and glass male mold half), similar to the mold shown in FIGS. 1-6 in U.S. Pat. Nos. 7,384,590 and 7,387,759 (FIGS. 1-6). Lens formulation in the molds is cured for 30 seconds with 452 nm LED light at an intensity of 55.4 mW/cm$^2$. After demolding and delensing, cast-molded contact lenses are then extracted and coated by dipping in the following series of baths: 3 methyl ethyl ketone (MEK) baths (about 22, 78, and 224 second respectively); DI water bath (56 seconds); PAA dip solution prepared in Example 1 (44 seconds); 50/50 n-propanol/water bath (56 seconds); 3 DI water baths (56 seconds each), then equilibrated into PBS solution.

The resultant silicone hydrogel contact lenses are packaged/sealed in polypropylene lens packaging shells (or blisters) (one lens per shell) containing 0.65 mL of IPC saline prepared in Example 1 and autoclaved for 45 minutes at 121° C.

Lenses contain 300, 500, and 700 ppm of Cu-TBP-MAm (HEVL blocker). UV-vis spectra were recorded, and are presented in FIG. 2. Lens properties are presented in the table below.

| Cu-TBP-MAm | % T at 420 nm | % T Average 380-450 nm |
|---|---|---|
| 300 ppm | 24% | 34% |
| 500 ppm | 11% | 42% |
| 700 ppm | 4% | 49% |

Example 4

Preparation of Lens Formulations with 300 ppm of Cu-TBP-MAm with 0.2% of UV28

A lens formulation is prepared to have the following composition: 0.03 parts by weight of Cu-TBP-MAm; 23.12 parts by weight of DMA; 22.49 parts by weight of PrOH; 0.02 parts by weight of RB247; 31.67 parts by weight of CE-PDMS; 19.66 parts by weight of TRIS-Aam; 0.76 parts by weight of DMPC; 0.61 parts by weight of L-PEG2000; 0.04 parts by weight of H-TEMPO; 0.90 parts by weight of Norbloc; 0.20 parts by weight of UV28 and 0.60 part by weight of GePI.

Cu-TBP-MAm, DMA and PrOH are charged to first amber vial with a stir bar to mix at 300 rpm for 30 minutes at room temperature. RB247, CE-PDMS, Tris-Aam, DMPC, L-PEG2000, H-TEMPO, UV28 and Norbloc are added into the second amber vial. Then under yellow light GePI is added to the second vial and all components are mixed at 300 rpm for 30 minutes at room temperature. When all the solids dissolved, the content of the first jar is transferred to the second jar using disposable glass pipette under yellow light. The mixture is allowed to stir for at least 30 min in the water bath preheated to 40° C. After all the solid is dissolved, the formulation is filtered with a glass micro filter (5.0 μm Millex®-SV filter).

Lens Fabrication

Lenses are prepared by cast-molding from the lens-forming composition prepared above in a reusable mold (quartz female mold half and glass male mold half), similar to the mold shown in FIGS. 1-6 in U.S. Pat. Nos. 7,384,590 and 7,387,759 (FIGS. 1-6). Lens formulation in the molds is cured for 30 seconds with 452 nm LED light at an intensity of 55.4 mW/cm$^2$. After demolding and delensing, cast-molded contact lenses are then extracted and coated by dipping in the following series of baths: 3 methyl ethyl ketone (MEK) baths (about 22, 78, and 224 second respectively); DI water bath (56 seconds); PAA dip solution prepared in Example 1 (44 seconds); 50/50 n-propanol/water bath (56 seconds); 3 DI water baths (56 seconds each), then equilibrated into PBS solution.

The resultant silicone hydrogel contact lenses are packaged/sealed in polypropylene lens packaging shells (or blisters) (one lens per shell) containing 0.65 mL of IPC saline prepared in Example 1 and autoclaved for 45 minutes at 121° C.

Lenses contain 300 ppm of Cu-TBP-MAm (HEVL blocker) and 0.2% of UV28 (UV/HEVL blocker). UV-vis spectra are recorded and are presented in FIG. 4. Lens properties are presented in the table below.

Preparation of Lens Formulations with 500 ppm of Cu-TBP-MAm with 0.3% of UV28

A lens formulation is prepared to have the following composition: 0.05 parts by weight of Cu-TBP-MAm; 23.12 parts by weight of DMA; 22.49 parts by weight of PrOH; 0.02 parts by weight of RB247; 31.67 parts by weight of CE-PDMS; 19.66 parts by weight of TRIS-Aam; 0.76 parts by weight of DMPC; 0.61 parts by weight of L-PEG2000; 0.04 parts by weight of H-TEMPO; 0.90 parts by weight of Norbloc; 0.30 parts by weight of UV28 and 0.60 part by weight of GePI.

Cu-TBP-MAm, DMA and PrOH are charged to first amber vial with a stir bar to mix at 300 rpm for 30 minutes at room temperature. RB247, CE-PDMS, Tris-Aam, DMPC, L-PEG2000, H-TEMPO, UV28 and Norbloc are added into the second amber vial. Then under yellow light GePI is added to the second vial and all components are mixed at 300 rpm for 30 minutes at room temperature. When all the solids dissolved, the content of the first jar is transferred to the second jar using disposable glass pipette under yellow light. The mixture is allowed to stir for at least 30 min in the water bath preheated to 40° C. After all the solid is dissolved, the formulation is filtered with a glass micro filter (5.0 μm Millex®-SV filter).

Lens Fabrication

Lenses are prepared by cast-molding from the lens-forming composition prepared above in a reusable mold (quartz female mold half and glass male mold half), similar to the mold shown in FIGS. 1-6 in U.S. Pat. Nos. 7,384,590 and 7,387,759 (FIGS. 1-6). Lens formulation in the molds is cured for 30 seconds with 452 nm LED light at an intensity of 55.4 mW/cm$^2$. After demolding and delensing, cast-molded contact lenses are then extracted and coated by dipping in the following series of baths: 3 methyl ethyl ketone (MEK) baths (about 22, 78, and 224 second respectively); DI water bath (56 seconds); PAA dip solution prepared in Example 1 (44 seconds); 50/50 n-propanol/water bath (56 seconds); 3 DI water baths (56 seconds each), then equilibrated into PBS solution.

The resultant silicone hydrogel contact lenses are packaged/sealed in polypropylene lens packaging shells (or blisters) (one lens per shell) containing 0.65 mL of IPC saline prepared in Example 1 and autoclaved for 45 minutes at 121° C.

Lenses contain 500 ppm of Cu-TBP-MAm (HEVL blocker) and 0.3% of UV28 (UV/HEVL blocker). UV-vis spectra are recorded and are presented in FIG. 3. Lens properties are presented in the table below.

| UV-28 | Cu-TBP-MAm | % T at 420 nm | % T Average 380-450 nm |
|---|---|---|---|
| 0.2% | 300 ppm | 19% | 46% |
| 0.3% | 500 ppm | 6% | 33% |

All the publications and patents which have been cited herein above are hereby incorporated by reference in their entireties.

What is claimed is:

1. A UV/HEVL-filtering contact lens, comprising a bulk hydrogel material that comprises:

(1) repeating units of at least one hydrophilic vinylic monomer;

(2) repeating units of at least one vinylic crosslinker;

(3) repeating units of at least one UV-absorbing vinylic monomer that absorbs UV lights between 280 nm and 380 nm;

(4) at least one UV/HEVL-absorbing vinylic monomer that absorbs UV lights between 280 nm and 380 nm and HEVL between 380 nm and 450 nm; and (5) derivatives of at least one Cu(II)-porphyrin, wherein the derivatives are covalently attached to the bulk hydrogel material and have an absorption peak in a region from 395 nm to 435 nm (i.e., a Soret peak or band) in visible absorption spectrum, wherein said components (3), (4) and (5) are present in the bulk hydrogel material in amounts and at a ratio for rendering the UV/HEVL-filtering contact lens to have a UVA % T of less than less 10%, UVB % T of less than 1%, a HEVL % T of about 60% or less, a % T at 420 nm of about 40% or less, and a % T of about 80% or greater at any wavelength between 450 nm and 500 nm.

2. The UV/HEVL-filtering contact lens of claim 1, wherein said at least one UV-absorbing vinylic monomer comprises a benzotriazole-containing vinylic monomer and/or a benzophenone-containing vinylic monomer.

3. The UV/HEVL-filtering contact lens of claim 1, wherein said at least one UV-absorbing vinylic monomer comprises a benzotriazole-containing vinylic monomer of formula (1)

(1)

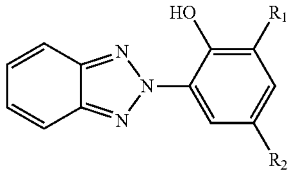

in which:

one of $R_1$ and $R_2$ is H while the other of $R_1$ and $R_2$ is a monovalent radical of $-L_1-E_1$; $E_1$ is vinyl, vinyloxy, allyl, allyloxy, (meth)acryloxy, or (meth)acrylamido; $L_1$ is a direct bond, a $C_1$-$C_6$ alkylene divalent radical, or a linkage of $-L_2-X_1-L_3-$; $L_2$ is a direct bond, a $C_1$-$C_3$ alkylene divalent radical,

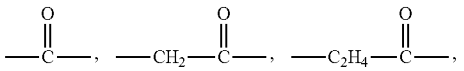

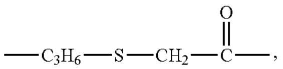

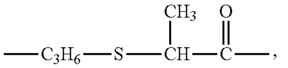 or

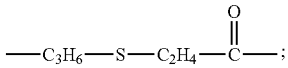

$X_1$ is O, NH, or

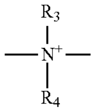

in which $R_3$ and $R_4$ are methyl or ethyl; $L_3$ is a $C_1$-$C_6$ alkylene divalent radical, wherein said at least one UV/HEVL-absorbing vinylic monomer comprises a benzotriazole-containing vinylic monomer of formula (2)

(2)

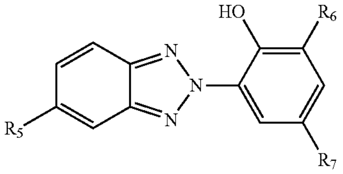

in which:

$R_5$ is H, F, Cl, $CF_3$, $CCl_3$, $CH_3$, or $OCH_3$; one of $R_6$ and $R_7$ is H, $OCH_3$, F, Cl, $CF_3$, $CCl_3$, or a $C_1$-$C_{10}$ alkyl while the other of $R_6$ and $R_7$ is a monovalent radical of $-L_1-E_1$; $E_1$ is vinyl, vinyloxy, allyl, allyloxy, (meth)acryloxy, or (meth)acrylamido; $L_1$ is a direct bond, a $C_1$-$C_6$ alkylene divalent radical, or a linkage of $-L_2-X_1-L_3-$; $L_2$ is a direct bond, a $C_1$-$C_3$ alkylene divalent radical,

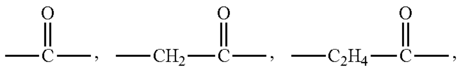

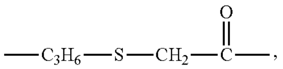

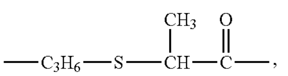 or

-continued

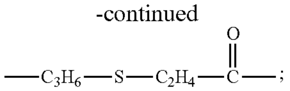

$X_1$ is O, NH, or

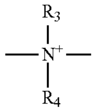

in which $R_3$ and $R_4$ are methyl or ethyl; $L_3$ is a $C_1$-$C_6$ alkylene divalent radical, provided that at least two of $R_5$, $R_6$ and $R_7$ are not H.

4. The UV/HEVL-filtering contact lens of claim 3, wherein said at least one UV-absorbing vinylic monomer comprises 2-(2'-hydroxy-5'-vinylphenyl)-2H-benzotriazole, 2-(2'-hydroxy-5'-methacryloxyphenyl)-2H-benzotriazole, 2-(2'-hydroxy-5'-acryloyloxyphenyl)-2H-benzotriazole, 2-[2'-hydroxy-5'-(2-methacryloxyethyl)phenyl)]-2H-benzotriazole (Norbloc), 2-[2'-hydroxy-5'-(2-acryloxyethyl)-phenyl)]-2H-benzotriazole, 2-(2'-hydroxy-5'-methacryloxypropylphenyl)-2H-benzotriazole, 2-(2'-hydroxy-5'-acryloxypropylphenyl)-2H-benzotriazole, or a combination thereof, wherein said at least one UV/HEVL-absorbing vinylic monomer comprises 2-(2'-hydroxy-3'-methacrylamidomethyl-5'-tert-octylphenyl)-2H-benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 4-allyl-2-(5-chloro-2H-benzo[d][1,2,3]triazol-2-yl)-6-methoxyphenol, 2-{2'-Hydroxy-3'-tert-butyl-5'-[3"-(4"-vinylbenzyloxy)propoxy]phenyl}-5-methoxy-2H-benzotriazole, 2-(5-chloro-2H-benzotriazol-2-yl)-6-(1,1-dimethylethyl)-4-ethenyl-phenol, 2-[2'-hydroxy-3'-tert-butyl-5'-(3'-methacryloyloxypropoxy)phenyl]-2H-benzotriazole, 2-{2'-Hydroxy-3'-tert-butyl-5'-[3'-methacryloyloxypropoxy]phenyl}-5-methoxy-2H-benzotriazole, 2-{2'-Hydroxy-3'-tert-butyl-5'-[3'-methacryloyloxypropoxy]phenyl}-5-chloro-2H-benzotriazole, 2-[2'-Hydroxy-3'-tert-butyl-5'-(3'-acryloyloxypropoxy)phenyl]-5-trifluoromethyl-2H-benzotriazole, 2-(2'-hydroxy-5-methacrylamidophenyl)-5-methoxybenzotriazole, 2-(3-allyl-2-hydroxy-5-methylphenyl)-2H-benzotriazole, 2-(2-Hydroxy-3-methallyl-5-methylphenyl)-2H-benzotriazole, 2-[3'-t-butyl-2'-hydroxy-5'-(3"-dimethylvinylsilylpropoxy)-2'-hydroxy-phenyl)]-5-methoxybenzotriazole, 2-(2'-hydroxy-5'-methacryloylpropyl-3'-tert-butyl-phenyl)-5-methoxy-2H-benzotriazole, 2-(2'-hydroxy-5'-acryloylpropyl-3'-tert-butyl-phenyl)-5-methoxy-2H-benzotriazole, 2-Methylacrylic acid 3-[3-tert-butyl-5-(5-chlorobenzotriazol-2-yl)-4-hydroxyphenyl]-propyl ester, 2-(3-(tert-butyl)-4-hydroxy-5-(5-methoxy-2H-benzo[d][1,2,3]triazol-2-yl)phenoxy)ethyl methacrylate; 2-(5-chloro-2H-benzotriazol-2-yl)-6-methoxy-4-(2-propen-1-yl)-phenol; 2-[2-Hydroxy-5-[3-(methacryloyloxy)propyl]-3-tert-butylphenyl]-5-chloro-2H-benzotriazole, or combinations thereof.

5. The UV/HEVL-filtering contact lens of claim 4, wherein said at least one Cu(II)-porphyrin comprises a Cu(II)-meso-aryl-substituted porphyrin.

6. The UV/HEVL-filtering contact lens of claim 4, wherein said at least one Cu(II)-porphyrin comprises a Cu(II)-meso-aryl-substituted porphyrin of formula (3) or (4)

(3)

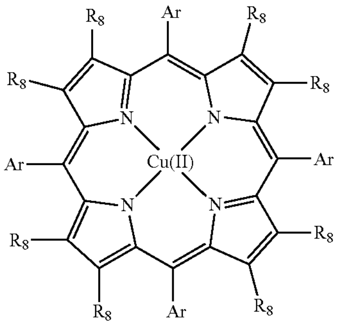

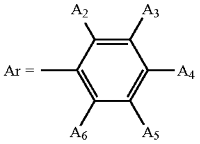

(4)

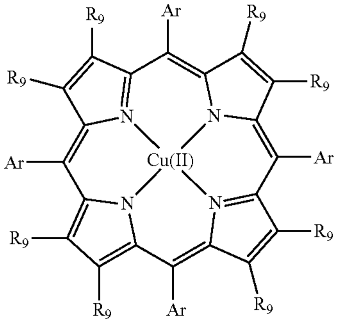

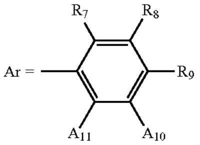

in which:

each of $R_3$ and $R_9$ is independently H, Cl, F, substituted or unsubstituted $C_1$-$C_{20}$ alkyl, substituted or unsubstituted $C_1$-$C_{20}$ alkenyl, substituted or unsubstituted $C_1$-$C_{20}$ alkynyl, or two adjacent $R_3$ groups, together with the atoms to which they are attached, form a substituted or unsubstituted $C_6$-$C_{14}$ aryl, substituted or unsubstituted $C_3$-$C_{14}$ carbocyclyl, substituted or unsubstituted $C_5$-$C_{14}$ heteroaryl, or substituted or unsubstituted $C_3$-$C_{14}$ heterocyclyl;

$A_2$, $A_3$, $A_4$, $A_5$, and $A_6$ independent of each other are H, Cl, F, $CCl_3$, $CF_3$, $CH_3$, $CH(CH_3)_2$, $C(CH_3)_3$, $OCH_3$, OH, $NO_2$, or a monovalent radical of $-L_1-E_1$;

$A_7$ and $A_{11}$ independent of each other are Cl, F, $CCl_3$, $CF_3$, $CH_3$, $CH(CH_3)_2$, $C(CH_3)_3$, $OCH_3$, OH, or $NO_2$ (preferably Cl, F, or $NO_2$);

$A_8$, $A_9$ and $A_{10}$ independent of one another are H, Cl, F, $CCl_3$, $CF_3$, $CH_3$, $CH(CH_3)_2$, $C(CH_3)_3$, $OCH_3$, OH, $NH_2$, or $NO_2$;

$E_1$ is vinyl, vinyloxy, allyl, allyloxy, (meth)acryloxy, or (meth)acrylamido;

$L_1$ is a direct bond, a $C_1$-$C_6$ alkylene divalent radical, or a linkage of $-L_2-X_1-L_3-$;

$L_2$ is a direct bond, a $C_1$-$C_3$ alkylene divalent radical,

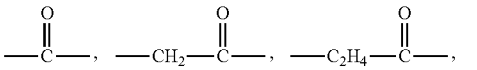

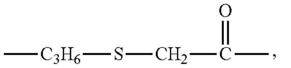

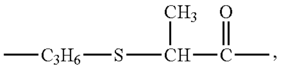

or

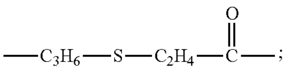

$X_1$ is O, NH, or

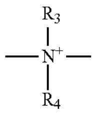

in which $R_3$ and $R_4$ are methyl or ethyl;

$L_3$ is a $C_1$-$C_6$ alkylene divalent radical, provided that one of $A_2$, $A_3$, $A_4$, $A_5$, and $A_6$ is a monovalent radical of -$L_1$-$E_1$.

7. The UV/HEVL-filtering contact lens of claim 6, wherein the bulk hydrogel material in dried state comprises from about 0.6% to about 3.5% by weight of all components (3), (4) and (5).

8. The UV/HEVL-filtering contact lens of claim 7, wherein said at least one hydrophilic vinylic monomer comprises: (1) an alkyl (meth)acrylamide selected from the group consisting of (meth)acrylamide, N,N-dimethyl (meth) acrylamide, N-ethyl (meth)acrylamide, N,N-diethyl (meth) acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth) acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth) acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof; (3) a carboxyl-containing acrylic monomer selected from the group consisting of 2-(meth)acrylamidoglycolic acid, (meth)acrylic acid, ethylacrylic acid, 3-(meth) acrylamidopropionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(meth)acrylamido-2methyl-3,3-dimethyl butanoic acid, 3-(meth)acrylamidohaxanoic acid, 4-(meth) acrylamido-3,3-dimethylhexanoic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth) acrylate, 3-amino-2-hydroxypropyl (meth)acrylate, trimethylammonium 2-hydroxy propyl (meth)acrylate hydrochloride, dimethylaminoethyl (meth)acrylate, and combinations thereof; (5) an N-vinyl amide monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (7) an acrylic monomer having a $C_1$-$C_4$alkoxyethoxy group and selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, methoxy-poly(ethylene glycol)ethyl (meth)acrylamide having a number average molecular weight of up to 1500, and combinations thereof; (8) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly (ethylene glycol) methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly (ethylene glycol) methyl allyl ether, and combinations thereof; (10) a phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloylamino]butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylarmonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2-(trimethylammonio)ethylphosphate, and combinations thereof; (11) allyl alcohol; (12)N-2-hydroxyethyl vinyl carbamate; (13)N-carboxyvinyl-β-alanine (VINAL); (14)N-carboxyvinyl-α-alanine; (15) or combinations thereof.

9. The UV/HEVL-filtering contact lens of claim 8, wherein the non-silicone hydrogel material comprises at least 50% by mole of repeating units of at least one hydroxyl-containing vinylic monomer.

10. The UV/HEVL-filtering contact lens of claim 8, wherein the bulk hydrogel material is a silicone hydrogel material that comprises:

(1) repeating units of at least one siloxane-containing vinylic monomer selected from the group consisting of a vinylic monomer having a bis(trialkylsilyloxy)alkylsilyl group, a vinylic monomer having a tris(trialkylsilyloxy)silyl group, a polysiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof; and/or (2) repeating units of at least one vinylic crosslinker comprises at least one polysiloxane vinylic crosslinker which comprises (i) a di-(meth)acryloyloxy-terminated polysiloxane vinylic crosslinker having dimethylsiloxane units and hydrophilized siloxane units each having one methyl substituent and one monovalent $C_4$-$C_{40}$ organic radical substituent having 2 to 6 hydroxyl groups, (ii) a hydrophilized polysiloxane vinylic crosslinker of formula (G)

in which:

d1 is an integer of from 30 to 500 and d2 is an integer of from 1 to 75, provided that d2/d1 is from about 0.035 to about 0.15;

$X_{01}$ is O or $NR_{IN}$ in which $R_{IN}$ is hydrogen or $C_1$-$C_{10}$-alkyl;

$R_{I0}$ is hydrogen or methyl;

$R_{I1}$ and $R_{I2}$ independently of each other are a substituted or unsubstituted $C_1$-$C_{10}$ alkylene divalent radical or a divalent radical of $—R_{I4}—O—R_{I5}—$ in which $R_{I4}$ and Rio independently of each other are a substituted or unsubstituted $C_1$-$C_{10}$ alkylene divalent radical;

$R_{I3}$ is a monovalent radical of any one of formula (G-1) to (G-5)

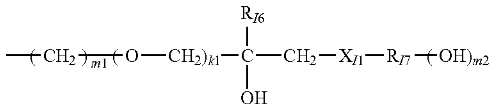
(G-1)

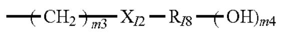
(G-2)

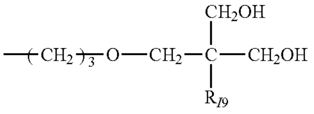
(G-3)

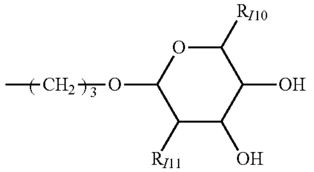
(G-4)

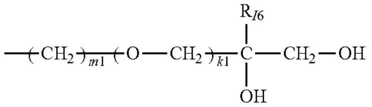
(G-5)

k1 is zero or 1; m1 is an integer of 2 to 4; m2 is an integer of 1 to 5; m3 is an integer of 3 to 6; m4 is an integer of 2 to 5;

$R_{I6}$ is hydrogen or methyl;

$R_{I7}$ is a $C_2$-$C_5$ hydrocarbon radical having (m2+1) valencies;

$R_{I8}$ is a $C_2$-$C_5$ hydrocarbon radical having (m4+1) valencies;

$R_{I9}$ is ethyl or hydroxymethyl;

$R_{I10}$ is methyl or hydromethyl;

$R_{I11}$ is hydroxyl or methoxy;

$X_{I1}$ is a sulfur linkage of —S— or a teriary amino linkage of $—NR_{I12}—$ in which $R_{I12}$ is $C_1$-$C_1$ alkyl, hydroxyethyl, hydroxypropyl, or 2,3-dihydroxypropyl; and

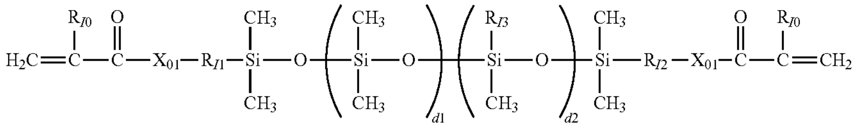
(G)

$X_{12}$ is an amide linkage of

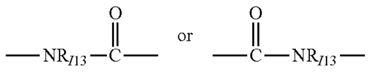

in which $R_{I13}$ is hydrogen or $C_1$-$C_{10}$ alkyl, (iii) a vinylic crosslinker which comprises one sole polydiorganosiloxane segment and two terminal ethylenically-unsaturated groups selected from the group consisting of (meth)acryloyloxy groups, (meth)acryloylamino groups, vinyl carbonate groups, vinylcarbamate groups, (iv) a chain-extended polysiloxane vinylic crosslinker which comprises at least two polydiorganosiloxane segment and a covalent linker between each pair of polydiorganosiloxane segments and two terminal ethylenically-unsaturated groups selected from the group consisting of (meth)acryloyloxy groups, (meth)acryloylamino groups, vinyl carbonate groups, vinylcarbamate groups, (v) a polysiloxane vinylic crosslinker selected from the group consisting of α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxypropyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, or combinations thereof, or (vi) combinations thereof.

11. The UV/HEVL-filtering contact lens of claim 10, wherein the UV/HEVL-filtering contact lens has an oxygen permeability of at least 40 barrers at about 35° C., an elastic modulus of about 2.0 MPa or less at a temperature of from 22° C. to 28° C., and a water content of from about 15% to about 70% at a temperature of from 22° C. to 28° C., when being fully hydrated.

12. The UV/HEVL-filtering contact lens of claim 11, wherein said at least one vinylic crosslinker comprises at least one non-silicone vinylic crosslinker.

13. The UV/HEVL-filtering contact lens of claim 12, wherein the bulk hydrogel material further comprises: repeating units of at least one hydrophobic non-silicone vinylic monomer;

and/or repeating units of a polymerizable dye.

14. The UV/HEVL-filtering contact lens of claim 13, wherein said at least one hydrophobic vinylic monomer comprises $C_1$-$C_{10}$ alkyl (meth)acrylate, cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoro-isopropyl (meth)acrylate, hexafluorobutyl (meth)acrylate, or combinations thereof, wherein the polymerizable dye is 1,4-bis(4-(2-methacryloxyethyl)phenylamino)anthraquinone (Reactive Blue 246), 1,4-bis((2-hydroxyethyl)amino)-9,10-anthracenedione-bis(2-propenoic)ester (Reactive Blue 247), or a combination thereof.

15. The UV/HEVL-filtering contact lens of claim 7, wherein weight ratio of component (3) over component (4) in the bulk hydrogel material in dried state is at least 1.2 and weight ratio of component (4) over component (5) is at least 1.5.

16. The UV/HEVL-filtering contact lens of claim 8, wherein weight ratio of component (3) over component (4) in the bulk hydrogel material in dried state is at least 1.2 and weight ratio of component (4) over component (5) is at least 1.5.

17. The UV/HEVL-filtering contact lens of claim 9, wherein weight ratio of component (3) over component (4) in the bulk hydrogel material in dried state is at least 1.2 and weight ratio of component (4) over component (5) is at least 1.5.

18. The UV/HEVL-filtering contact lens of claim 10, wherein weight ratio of component (3) over component (4) in the bulk hydrogel material in dried state is at least 1.2 and weight ratio of component (4) over component (5) is at least 1.5.

19. The UV/HEVL-filtering contact lens of claim 11, wherein weight ratio of component (3) over component (4) in the bulk hydrogel material in dried state is at least 1.2 and weight ratio of component (4) over component (5) is at least 1.5.

20. The UV/HEVL-filtering contact lens of claim 12, wherein weight ratio of component (3) over component (4) in the bulk hydrogel material in dried state is at least 1.2 and weight ratio of component (4) over component (5) is at least 1.5.

* * * * *